US012803964B2

United States Patent

(12) United States Patent
Xu et al.

(10) Patent No.: US 12,803,964 B2
(45) Date of Patent: Nov. 17, 2026

(54) COMMUNICATION METHOD AND COMMUNICATION DEVICE

(71) Applicant: HUAWEI TECHNOLOGIES CO., LTD., Shenzhen (CN)

(72) Inventors: Yishan Xu, Shanghai (CN); Li Hu, Shenzhen (CN); Hualin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 18/606,051

(22) Filed: Mar. 15, 2024

(65) Prior Publication Data

US 2024/0223548 A1 Jul. 4, 2024

Related U.S. Application Data

(63) Continuation of application No. PCT/CN2022/119177, filed on Sep. 16, 2022.

(30) Foreign Application Priority Data

Sep. 19, 2021 (CN) .......................... 202111101555.1

(51) Int. Cl.
*H04L 9/40* (2022.01)

(52) U.S. Cl.
CPC .................................... *H04L 63/08* (2013.01)

(58) Field of Classification Search
CPC ...... H04L 63/08; H04W 12/08; H04W 12/06; H04W 12/062; H04W 8/06
See application file for complete search history.

(56) References Cited

U.S. PATENT DOCUMENTS 9,264,898 B2 * 2/2016 Schroeder ............... H04W 8/06
2021/0051468 A1 * 2/2021 Baskaran .............. H04W 48/16
(Continued)

FOREIGN PATENT DOCUMENTS

| | | | |
|---|---|---|---|
| CN | 111182543 A | 5/2020 |
| CN | 115843027 A | 3/2023 |
| WO | 2021133092 A1 | 7/2021 |

OTHER PUBLICATIONS

Huawei et al."selection of AUSF supporting primary authentication towards AAA server", 3GPP TSG-WG SA2 Meeting #146E e-meeting S2-2106057,Aug. 10, 2021, total 3 pages.
(Continued)

*Primary Examiner* — Benjamin A Kaplan
(74) *Attorney, Agent, or Firm* — HAUPTMAN HAM, LLP

(57) ABSTRACT

Embodiments of this application provide a communication method and a communication device. The communication method includes: A mobility management device obtains first information of a terminal device, where the first information includes a home network identifier and/or a routing indicator that are/is of the terminal device, the first information indicates the mobility management device to select a second authentication device of a second network, a credential of the terminal device belongs to the second network, and the second authentication device is not deployed in the second network. The mobility management device selects a first authentication device based on the first information, where the first authentication device and the mobility management device belong to a first network. According to the method, in this application, the terminal device can be enabled to perform authentication when the second authentication device is not deployed in the second network.

25 Claims, 7 Drawing Sheets

(56) References Cited

U.S. PATENT DOCUMENTS

| | | | |
|---|---|---|---|
| 2021/0058784 A1 | 2/2021 | Kedalagudde et al. | |
| 2022/0386120 A1* | 12/2022 | Kim | H04L 63/0892 |
| 2023/0057968 A1* | 2/2023 | Sharma | H04W 12/033 |

OTHER PUBLICATIONS

Chinese Office Action issued in corresponding Chinese Application No. 202111101555.1, dated May 30, 2024, pp. 1-11.

Chinese Office Action issued in corresponding Chinese Application No. 202210724403.5, dated May 24, 2024, pp. 1-9.

3GPP TSG-SA3 Meeting #104-e Ad-hoc S3-213556, Update to Solution #23, Lenovo, Motorola Mobility, e-meeting, Sep. 27-30, 2021, total 4 pages.

3GPP TSG-SA3 Meeting #104e S3-212734, Change request to living document: EAP flow, Ericsson, e-meeting, Aug. 16-27, 2021, total 8 pages.

3GPP TS 23.501 V17.1.1, 3rd Generation Partnership Project; Technical Specification Group Services and System Aspects; System architecture for the 5G System (5GS); Stage 2 (Release 17), Jun. 2021, total 520 pages.

International Search Report issued in corresponding International Application No. PCT/CN2022/119177, dated Dec. 13, 2022, pp. 1-10.

Partial Supplementary European Search Report issued in corresponding European Application No. 22869363.6, dated Nov. 20, 2024, pp. 1-15.

ETSI TS 129 526 V16.2.0 (Jan. 2021), 5G; 5G System; Network Slice-Specific Authentication and Authorization (NSSAA) services; Stage 3 (3GPP TS 29.526 version 16.2.0 Release 16), total 34 pages.

3GPP TS 23.502 V17.1.0 (Jun. 2021), 3rd Generation Partnership Project; Technical Specification Group Services and System Aspects; Procedures for the 5G System (5GS); Stage 2(Release 17), total 692 pages.

3GPP TS 29.500 V17.4.0 (Sep. 2021), 3rd Generation Partnership Project; Technical Specification Group Core Network and Terminals;5G System; Technical Realization of Service Based Architecture; Stage 3 (Release 17), total 109 pages.

3GPP TS 29.501 V17.3.0 (Sep. 2021), 3rd Generation Partnership Project; Technical Specification Group Core Network and Terminals;5G System; Principles and Guidelines for Services Definition; Stage 3 (Release 17), total 78 pages.

Canada Office Action issued in corresponding Canadian Patent Application No. 3,232,916, dated Jan. 22, 2026, pp. 1-5.

Office Action issued in corresponding India Application No. 202447021014 dated Aug. 11, 2026.

* cited by examiner

COMMUNICATION METHOD AND COMMUNICATION DEVICE

CROSS-REFERENCE TO RELATED APPLICATIONS

This application is a continuation of International Application No. PCT/CN2022/119177, filed on Sep. 16, 2022, which claims priority to Chinese Patent Application No. 202111101555.1, filed on Sep. 19, 2021. The disclosure of the aforementioned applications is hereby incorporated by reference in their entireties.

BACKGROUND

In response to a terminal device accessing a first network by using a credential (which is also referred to as an external credential) of a second network, the first network is a network that supports the external credential, for example, a standalone non-public network (standalone non-public network, SNPN). In other words, in a process in which the terminal device accesses the first network, a network different from the first network, for example, a credentials holder (credentials holder, CH), performs primary authentication or a security procedure of the terminal device.

Because devices used by different second networks to perform the primary authentication or the security procedure of the terminal device are different, devices that are in the first network and that interact with the second networks are also different. Therefore, a communication scenario of an error case (error case) or an abnormal case (abnormal case) often an abnormal case (abnormal case) often occurs.

Therefore, a communication method that enables the terminal device to perform authentication is urgently desired.

SUMMARY

Embodiments described herein provide a communication method and a communication device, so that a terminal device is enabled to perform authentication.

According to a first aspect, a communication method is provided, including: A mobility management device obtains first information of a terminal device, where the first information includes a home network identifier and/or a routing indicator that are/is of the terminal device, the first information indicates the mobility management device to select a second authentication device of a second network, a credential of the terminal device belongs to the second network, and the second authentication device is not deployed in the second network. The mobility management device selects a first authentication device based on the first information, where the first authentication device and the mobility management device belong to a first network.

According to the foregoing technical solution, in at least one embodiment, in response to the terminal device using the credential of the second network, and the second network using an authentication, authorization, and accounting server to perform authentication, the mobility management device of the first network selects the first authentication device of the first network, and does not send registration reject information to the terminal device in response to the second authentication device of the second network not being found, to avoid a case in which the terminal device cannot register with or access the first network, thereby enabling the terminal device to successfully register with or access the first network.

With reference to the first aspect, in some implementations of the first aspect, the method further includes: The mobility management device does not discover the second authentication device based on the first information.

With reference to the first aspect, in some implementations of the first aspect, the method further includes: The mobility management device selects the first authentication device based on configuration information, where the configuration information indicates the mobility management device to select the first authentication device based on the first information in response to the second authentication device not being discovered.

With reference to the first aspect, in some implementations of the first aspect, that the mobility management device selects a first authentication device based on the first information includes: The mobility management device further obtains indication information from the terminal device, where the indication information indicates that the first network supports an external credential and/or that the terminal device uses the external credential. The mobility management device selects the first authentication device based on the indication information.

The terminal device sends the indication information to the mobility management device of the first network, where the indication information indicates that the first network supports the external credential, or indicates that the terminal device uses the external credential. This is conductive for the mobility management device of the first network to select the first authentication device of the first network in response to the second authentication device of the second network not being discovered. In this way, an access or registration process in which the terminal device accesses the first network is completed.

With reference to the first aspect, in some implementations of the first aspect, that the mobility management device selects a first authentication device based on the first information includes: The mobility management device sends request information to a network storage device, where the request information is used to request to discover the second authentication device, and the request information includes the first information. The mobility management device obtains response information from the network storage device, where the response information indicates that the second authentication device is not discovered, and/or the response information includes identification information and/or address information that are/is of the first authentication device. The mobility management device selects the first authentication device based on the response information.

The mobility management device of the first network sends the request information to the network storage device, to request the network storage device to discover the second authentication device of the second network, and selects the first authentication device based on the response information fed back by the network storage device. This is conductive for the mobility management device of the first network to select the first authentication device of the first network in response to the second authentication device of the second network not being discovered. In this way, an access or registration process in which the terminal device accesses the first network is completed.

With reference to the first aspect, in some implementations of the first aspect, the request information further includes first indication information, and the first indication information indicates that the first network supports an external credential and/or that the terminal device uses the external credential.

The indication information is conductive for the network storage device of the first network to determine that the first network supports the external credential, or determine that the terminal device uses the external credential. In this way, in response to the second authentication device of the second network not being discovered, the network storage device of the first network feeds back, to the mobility management device, that the second authentication device is not discovered, or feeds back the identification information and/or the address information that are/is of the first authentication device. This is conductive for the mobility management device of the first network to select the first authentication device of the first network. In this way, the access or registration process in which the terminal device accesses the first network is completed.

With reference to the first aspect, in some implementations of the first aspect, that the mobility management device selects a first authentication device based on the first information includes: The mobility management device further obtains a network identifier from an access network device, where the network identifier indicates that the first network is a non-public network. The mobility management device selects the first authentication device based on an identifier of the first network and the first information.

Specifically, the mobility management device of the first network determines, based on the network identifier, that the first network is the non-public network, and determines, based on the first information, that the credential of the terminal device belongs to the second network. Therefore, the mobility management device of the first network determines that the first network supports an external credential, or determines that the terminal device uses the external credential.

The access network device sends the network identifier to the mobility management device. This is conducive for the mobility management device of the first network to select the first authentication device of the first network in response to the mobility management device of the first network determining that the first network supports the external credential or the terminal device using the external credential, and in response to the second authentication device of the second network not being discovered. In this way, an access or registration process in which the terminal device accesses the first network is completed.

With reference to the first aspect, in some implementations of the first aspect, that the mobility management device selects a first authentication device based on the first information includes: The mobility management device selects the first authentication device based on the configuration information, where the configuration information includes one or more home network identifiers and/or one or more routing indicators.

With reference to the first aspect, in some implementations of the first aspect, that the mobility management device selects the first authentication device based on configuration information includes: in response to the home network identifier and/or the routing indicator that are/is of the terminal device matching the one or more home network identifiers and/or the one or more routing indicators, the mobility management device selects the first authentication device.

In response to the home network identifier and/or the routing indicator that are/is of the terminal device matching the configuration information of the mobility management device of the first network, the mobility management device of the first network selects the first authentication device of the first network. This is conducive for completing the access or registration process in which the terminal device accesses the first network.

With reference to the first aspect, in some implementations of the first aspect, the configuration information is pre-configured in the mobility management device, or is obtained by the mobility management device from a control plane device. The control plane device includes a policy control device, a unified data management device, a user data repository device, an application function device, a network exposure device, or the network storage device.

With reference to the first aspect, in some implementations of the first aspect, the first authentication device is an authentication server function device.

With reference to the first aspect, in some implementations of the first aspect, the second authentication device is an authentication server function device.

According to a second aspect, a communication method is provided, including: A network storage device receives request information from a mobility management device, where the request information includes a home network identifier and/or a routing indicator that are/is of a terminal device, the request information is used to request to discover a second authentication device of a second network, a credential of the terminal device belongs to the second network, and the second authentication device is not deployed in the second network. The network storage device sends response information to the mobility management device, where the response information includes an indication that the second authentication device is not discovered, and/or the response information includes identification information and/or address information that are/is of a first authentication device, where the first authentication device, the network storage device, and the mobility management device belong to a first network.

According to the foregoing technical solution, in at least one embodiment, in response to the terminal device using the credential of the second network, and the second network using an authentication, authorization, and accounting server to perform authentication, the mobility management device of the first network selects the first authentication device of the first network, and does not send registration reject information to the terminal device in response to the second authentication device of the second network not being found, to avoid a case in which the terminal device cannot register with or access the first network, thereby enabling the terminal device to successfully register with or access the first network.

With reference to the second aspect, in some implementations of the second aspect, the request information further includes first indication information, and the first indication information indicates that the first network supports an external credential and/or that the terminal device uses the external credential.

The indication information is conductive for the network storage device of the first network to determine that the first network supports the external credential, or determine that the terminal device uses the external credential. In this way, in response to the second authentication device of the second network not being discovered, the network storage device of the first network feeds back, to the mobility management device, that the second authentication device is not discovered or feeds back the identification information and/or the address information that are/is of the first authentication device. This is conductive for the mobility management device of the first network to select the first authentication device of the first network. In this way, an access or registration process in which the terminal device accesses the first network is completed.

With reference to the second aspect, in some implementations of the second aspect, before that the network storage device sends response information to the mobility management device, the method further includes: A network repository function network element does not discover the second authentication device.

With reference to the second aspect, in some implementations of the second aspect, that the network storage device sends response information to the mobility management device includes: in response to the home network identifier and/or the routing indicator that are/is of the terminal device matching configuration information, the network storage device determines to send the response information, where the configuration information includes one or more home network identifiers and/or one or more routing indicators: the network storage device determines, based on the first indication information, to send the response information: or the network storage device determines to send the response information in response to the second authentication device not being discovered.

With reference to the second aspect, in some implementations of the second aspect, the configuration information is pre-configured in the network storage device, or is obtained by the network storage device from a control plane device. The control plane device includes the mobility management device, a unified data management device, a policy control device, a user data repository device, a network exposure device, or an application function device.

The foregoing described solutions are conducive for the network storage device of the first network to feed back the response information to the mobility management device of the first network in response to the network storage device of the first network not discovering the second authentication device of the second network, and are conducive for the mobility management device of the first network to select the first authentication device of the first network. This is conducive for completing the access or registration process in which the terminal device accesses the first network.

According to a third aspect, a communication method is provided, including: A third authentication device obtains second information, where the second information indicates a terminal device to perform onboarding. The third authentication device determines a fourth authentication device based on the second information, where the fourth authentication device is configured to perform an authentication procedure of the terminal device.

In at least one embodiment, through the third authentication device, that in response to the terminal device performing the onboarding, the terminal device selects a network slice-specific and non-public network authentication and authorization device to interact with or directly interacts with a default credential server, so that the terminal device successfully accesses a network to perform the onboarding. In addition, a case in which the terminal device cannot access the network because of an authentication failure or an introduced error case or abnormal case, which results from that a data management device does not have subscription data related to the terminal device after the third authentication device selects the data management device, and interacts with the data management device, is avoided.

With reference to the third aspect, in some implementations of the third aspect, the second information is sent by a mobility management device: or the second information is sent by the terminal device.

With reference to the third aspect, in some implementations of the third aspect, in response to the second information being sent by the terminal device, the second information is a subscription concealed identifier of the terminal device.

The terminal device sends the second information to the third authentication device. This is conducive for the third authentication device to learn that to perform the onboarding, the terminal device selects the network slice-specific and non-public network authentication and authorization device to interact with or directly interacts with the default credential server, so that the terminal device successfully accesses the network to perform the onboarding. In addition, a case in which the terminal device cannot access the network because of the authentication failure or the introduced error case or abnormal case, which results from that a unified data management device does not have the subscription data related to the terminal device after the third authentication device selects the unified data management device, and interacts with the unified data management device, is avoided.

With reference to the third aspect, in some implementations of the third aspect, the fourth authentication device includes one or more of the following devices: the network slice-specific and SNPN authentication and authorization device, the default credential server, and an authentication, authorization, and accounting server.

With reference to the third aspect, in some implementations of the third aspect, the method further includes: The third authentication device skips selecting the unified data management device.

In at least one embodiment, through the third authentication device, that in response to the terminal device performing the onboarding, the terminal device selects the network slice-specific and non-public network authentication and authorization device to interact with or directly interacts with the default credential server, so that the terminal device successfully accesses the network to perform the onboarding. In addition, the case in which the terminal device cannot access the network because of the authentication failure or the introduced error case or abnormal case, which results from that the unified data management device does not have the subscription data related to the terminal device after the third authentication device selects the unified data management device, and interacts with the unified data management device, is avoided.

With reference to the third aspect, in some implementations of the third aspect, the method further includes: The third authentication device obtains a subscription permanent identifier of the terminal device based on the subscription concealed identifier of the terminal device.

In response to the third authentication device skipping selecting the unified data management device, the subscription concealed identifier of the terminal device cannot be decrypted or restored to the permanent identifier by using the unified data management device. However, in a registration procedure of the terminal device, signaling exchange between core network devices (or control plane devices) usually is to include identification information of the terminal device, and the identification information is usually the permanent identifier. Therefore, in response to learning that the terminal device performs the onboarding, or learning that the terminal device performs registration for the onboarding, the third authentication device obtains or restore the permanent identifier based on the subscription concealed identifier, to ensure that the signaling exchange between the core network devices (or the control plane devices) is not affected.

With reference to the third aspect, in some implementations of the third aspect, the method further includes: The third authentication device restores the subscription permanent identifier of the terminal device from the subscription concealed identifier of the terminal device.

According to a fourth aspect, a communication device is provided, including: a transceiver unit, configured to obtain first information of a terminal device, where the first information includes a home network identifier and/or a routing indicator that are/is of the terminal device, the first information indicates a mobility management device to select a second authentication device of a second network, a credential of the terminal device belongs to the second network, and the second authentication device is not deployed in the second network: and a processing unit, configured to select a first authentication device based on the first information, where the first authentication device and the mobility management device belong to a first network.

With reference to the fourth aspect, in some implementations of the fourth aspect, the processing unit is further configured to: not discover the second authentication device based on the first information.

With reference to the fourth aspect, in some implementations of the fourth aspect, the processing unit is configured to select the first authentication device based on configuration information, where the configuration information indicates the mobility management device to select the first authentication device based on the first information in response to the second authentication device not being discovered.

With reference to the fourth aspect, in some implementations of the fourth aspect, the transceiver unit is further configured to obtain indication information from the terminal device, where the indication information indicates that the first network supports an external credential and/or that the terminal device uses the external credential. The processing unit is configured to select the first authentication device based on the indication information.

With reference to the fourth aspect, in some implementations of the fourth aspect, request information further includes first indication information, and the first indication information indicates that the first network supports the external credential and/or that the terminal device uses the external credential.

With reference to the fourth aspect, in some implementations of the fourth aspect, the transceiver unit is configured to send the request information to a network storage device, where the request information is used to request to discover the second authentication device, and the request information includes the first information. The transceiver unit is configured to obtain response information from the network storage device, where the response information indicates that the second authentication device is not discovered, and/or the response information includes identification information and/or address information that are/is of the first authentication device. The processing unit is configured to select the first authentication device based on the response information.

With reference to the fourth aspect, in some implementations of the fourth aspect, the transceiver unit is further configured to obtain a network identifier from an access network device, where the network identifier indicates that the first network is a non-public network. The processing unit is configured to select the first authentication device based on an identifier of the first network and the first information.

With reference to the fourth aspect, in some implementations of the fourth aspect, the processing unit is configured to select the first authentication device based on the configuration information, where the configuration information includes one or more home network identifiers and/or one or more routing indicators.

With reference to the fourth aspect, in some implementations of the fourth aspect, in response to the home network identifier and/or the routing indicator that are/is of the terminal device matching the one or more home network identifiers and/or the one or more routing indicators, the processing unit is configured to select the first authentication device.

With reference to the fourth aspect, in some implementations of the fourth aspect, the configuration information is pre-configured in the mobility management device, or is obtained by the mobility management device from a control plane device. The control plane device includes a policy control device, a unified data management device, a user data repository device, an application function device, a network exposure device, or the network storage device.

With reference to the fourth aspect, in some implementations of the fourth aspect, the first authentication device is an authentication server function device.

With reference to the fourth aspect, in some implementations of the fourth aspect, the second authentication device is an authentication server function device.

According to a fifth aspect, a communication device is provided, including: a transceiver unit, configured to obtain request information from a mobility management device, where the request information includes a home network identifier and/or a routing indicator that are/is of a terminal device, the request information is used to request to discover a second authentication device of a second network, a credential of the terminal device belongs to the second network, and the second authentication device is not deployed in the second network: and a processing unit, configured to send response information to the mobility management device, where the response information includes an indication that the second authentication device is not discovered, and/or the response information includes identification information and/or address information that are/is of a first authentication device, where the first authentication device, a network storage device, and the mobility management device belong to a first network.

With reference to the fifth aspect, in some implementations of the fifth aspect, the request information includes first indication information, and the first indication information indicates that the first network supports an external credential and/or that the terminal device uses the external credential.

With reference to the fifth aspect, in some implementations of the fifth aspect, the processing unit is configured to: not discover the second authentication device.

With reference to the fifth aspect, in some implementations of the fifth aspect, in response to the home network identifier and/or the routing indicator that are/is of the terminal device matching configuration information, the processing unit is configured to determine to send the response information, where the configuration information includes one or more home network identifiers and/or one or more routing indicators: the processing unit is configured to determine, based on the first indication information, to send the response information: or the processing unit is configured to determine to send the response information in response to the second authentication device not being discovered.

With reference to the fifth aspect, in some implementations of the fifth aspect, the configuration information is pre-configured in the network storage device, or is obtained by the network storage device from a control plane device. The control plane device includes the mobility management device, a unified data management device, a policy control device, a user data repository device, a network exposure device, or an application function device.

According to a sixth aspect, a communication device is provided, including: a transceiver unit, configured to obtain second information, where the second information indicates a terminal device to perform onboarding: and a processing unit, configured to determine a fourth authentication device based on the second information, where the fourth authentication device is configured to perform an authentication procedure of the terminal device.

With reference to the sixth aspect, in some implementations of the sixth aspect, the second information is sent by a mobility management device: or the second information is sent by the terminal device.

With reference to the sixth aspect, in some implementations of the sixth aspect, in response to the second information being sent by the terminal device, the second information is a subscription concealed identifier of the terminal device.

With reference to the sixth aspect, in some implementations of the sixth aspect, the fourth authentication device includes one or more of the following devices: a network slice-specific and SNPN authentication and authorization device, a default credential server, and an authentication, authorization, and accounting server.

With reference to the sixth aspect, in some implementations of the sixth aspect, the processing unit is further configured to skip selecting a unified data management device.

With reference to the sixth aspect, in some implementations of the sixth aspect, the processing unit is further configured to obtain a subscription permanent identifier of the terminal device based on the subscription concealed identifier of the terminal device.

With reference to the sixth aspect, in some implementations of the sixth aspect, the processing unit is further configured to restore the subscription permanent identifier of the terminal device from the subscription concealed identifier of the terminal device.

According to a seventh aspect, a computer-readable storage medium is provided. The computer-readable storage medium stores a computer program or instructions, where the computer program or the instructions are used to implement any method in the method according to any one of the first aspect and the implementations of the first aspect, the method according to any one of the second aspect and the implementations of the second aspect, or the method according to any one of the third aspect and the implementations of the third aspect.

According to an eighth aspect, a computer program product is provided. In response to the computer program product runs on a computer, the computer is enabled to perform any method in the method according to any one of the first aspect and the implementations of the first aspect, the method according to any one of the second aspect and the implementations of the second aspect, or the method according to any one of the third aspect and the implementations of the third aspect.

According to a ninth aspect, a communication system is provided, including a mobility management device configured to perform the method according to any one of the first aspect and the implementations of the first aspect, and a network storage device configured to perform the method according to any one of the second aspect and the implementations of the second aspect.

According to a tenth aspect, a communication system is provided, including a mobility management device configured to perform the method according to any one of the first aspect and the implementations of the first aspect, a network storage device configured to perform the method according to any one of the second aspect and the implementations of the second aspect, and a third authentication device configured to perform the method according to any one of the third aspect and the implementations of the third aspect.

DESCRIPTION OF EMBODIMENTS

The following describes technical solutions of at least one embodiment with reference to the accompanying drawings.

The technical solutions in at least one embodiment described herein are applied to various communication systems, such as a global system for mobile communications (global system of mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system or new radio (new radio, NR) system, and another communication system in the future.

A terminal device in at least one embodiment is a user equipment, an access terminal, a subscriber unit, a subscriber station, a mobile station, a remote station, a remote terminal, a mobile device, a user terminal, a terminal, a wireless communication device, a user agent, or a user apparatus. The terminal device is alternatively a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a public land mobile network (public land mobile network, PLMN), or the like. This is not limited in at least one embodiment.

A network device in at least one embodiment is a device configured to communicate with the terminal device. The network device is a base transceiver station (base transceiver station, BTS) in the GSM system or the CDMA system, is a NodeB (nodeB, NB) in the WCDMA system, is an evolved NodeB (evolutional nodeB, eNB or eNodeB) in the LTE system, or is a radio controller in a cloud radio access network (cloud radio access network, CRAN) scenario. Alternatively, the network device is a relay station, an access point, a vehicle-mounted device, a wearable device, a network device in the 5G network, a network device in the PLMN network, a network device in a non-public network, or the like. This is not limited in at least one embodiment.

The following describes the technical solutions of at least one embodiment with reference to the accompanying drawings.

Figure 1:
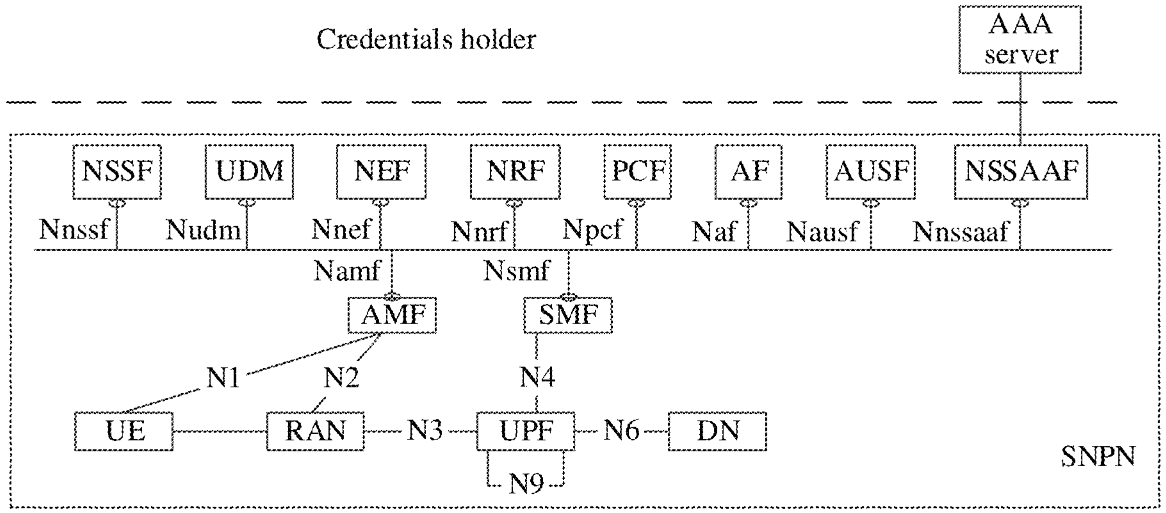
FIG. 1 is a schematic diagram of a communication system.

FIG. 1 is a schematic diagram of a communication system. As shown in FIG. 1, a network includes an access and mobility management function (access and mobility management function, AMF), a network exposure function (network exposure function, NEF), a network repository function (network repository function, NRF), unified data management (unified data management, UDM), a radio access network (radio access network, RAN) device, a policy control function (policy control function, PCF), a user equipment (user equipment, UE), a policy control function (policy control function, PCF), a user plane function (user plane function, UPF), a data network (data network, DN), an authentication server function (authentication server function, AUSF), a network slice selection function (network slice selection function, NSSF), an AAA server (authentication, authorization, and accounting server, AAA Server), a network slice-specific and SNPN authentication and authorization function (network slice-specific and SNPN authentication and authorization function, NSSAAF), and the like.

FIG. 1 is merely a schematic description diagram. A quantity and types of network elements (or devices) actually deployed in the network are not limited in at least one embodiment.

In the schematic diagram shown in FIG. 1, a device that is in a dashed-line box belongs to a first network, and a device that is not in the dashed-line box belongs to a second network. The second network is different from the first network that the UE is to access, and is used to perform a security procedure on the UE that accesses the first network. The first network is a public network (public land mobile network, PLMN) or a non-public network (non-public network, NPN), for example, an SNPN or a public network integrated non-public network (public network integrated non-public network, PNI-NPN). The second network is a PLMN or an NPN. Because a credential of the UE belongs to the second network, the second network is also referred to as a credentials holder (credentials holder, CH).

Main functions of the devices shown in FIG. 1 are described as follows.

The UE is referred to as a terminal device, an access terminal, a subscriber unit, a subscriber station, a mobile station, a remote station, a remote terminal, a mobile device, a user terminal, a terminal, a wireless communication device, a user agent, or a user apparatus.

In addition, the UE is alternatively a terminal device in an internet of things (internet of things, IoT) system. IoT is an important part of future information technology development. A main technical feature of the IoT is to connect things to a network by using a communication technology, to implement an intelligent network for human-machine interconnection and thing-thing interconnection. An IoT technology uses, for example, a narrow band (narrow band) NB technology to achieve massive connection, in-depth coverage, and power saving of a terminal.

In addition, the UE further includes sensors such as an intelligent printer, a train detector, and a gas station, and main functions include: collecting data (which is a function of some terminal devices), receiving control information and downlink data of a network device, sending an electromagnetic wave, and transmitting uplink data to the network device.

The UE is any device that accesses the network. The UE and an access network device communicate with each other by using an air interface technology.

The radio access network (radio access network, RAN) device (which is also referred to as an access network device) corresponds to different access network in 5G in a plurality of manners such as wired access and wireless base station access. The RAN device in at least one embodiment includes but is not limited to: a next generation NodeB (gnodeB, gNB) in 5G, an evolved NodeB (evolved node B, eNB), a radio network controller (radio network controller, RNC), a NodeB (node B, NB), a base station controller (base station controller, BSC), a base transceiver station (base transceiver station, BTS), a home base station (for example, a home evolved nodeB or a home node B, HNB), a baseband unit (base band unit, BBU), a transmission reception point (transmitting and receiving point, TRP), a transmission point (transmitting point, TP), or a mobile switching center.

The unified data management (unified data management, UDM) (which is also referred to as a unified data management network element, a unified data management entity, a data management device, or a unified data management device) is a type of a core network device, and is mainly configured to process an identifier of the terminal device, access authentication, registration, mobility management, and the like. The unified data management device is a control plane device.

The policy control function (policy control function, PCF) (which is also referred to as a policy control network element, a policy control function network element, a policy control device, a policy control functional entity, or the like) is mainly responsible for policy control functions such as session and service flow level accounting, quality of service (quality of service, QoS) and bandwidth assurance, mobility management, and UE policy decision.

A session management function (session management function, SMF) mainly performs functions such as session management, PCF-delivered control policy execution, UPF selection, and UE IP address allocation.

The access and mobility management function (access and mobility management function, AMF) (which is also referred to as an access and mobility management functional entity, an access and mobility management device, an access and mobility management network element, an access management device, or a mobility management device) is a type of the core network device, is mainly used for mobility management, access management, and the like, and is configured to implement functions, other than session management, in a mobility management entity (mobility management entity, MME) function, for example, functions such as lawful interception, access authorization (or authentication), user equipment registration, mobility management, a tracking area update procedure, reachability detection, session management network element selection, and mobility state transition management. For example, in 5G, the access and mobility management network element is an access and mobility management function (access and mobility management function, AMF) network element. In future communication, for example, in 6G, the access and mobility management network element is still the AMF network element or have another name. This is not limited in at least one embodiment. In response to the access and mobility management network element being the AMF network element, the AMF provides an Namf service.

The user plane function (user plane function, UPF) (which is also referred to as a user plane device, a user plane function network element, a user plane network element, or a user plane functional entity) mainly includes the following functions: user plane-related functions such as data packet routing and transmission, packet detection, service usage reporting, QoS processing, lawful interception, uplink packet detection, and downlink data packet storage.

The authentication server function (authentication server function, AUSF) (which is also referred to as an authentication server function network element, an authentication server functional entity, an authentication server device, or an authentication device) is mainly configured to perform user authentication and authentication, that is, authentication between the UE and an operator network. After receiving an authentication request initiated by a subscriber, the authentication server function network element performs authentication and/or authorization on the subscriber based on authentication information and/or authorization information that are/is stored in the unified data management network element, or generates authentication and/or authorization information that are/is of the subscriber by using the unified data management network element. The authentication server function network element feeds back the authentication information and/or the authorization information to the subscriber. In at least one embodiment, the authentication server function network element is also co-located with the unified data management network element. In a 5G communication system, the authentication server function network element is the authentication server function (authentication server function, AUSF) network element. In a future communication system, the unified data management is still the AUSF, or has another name. This is not limited in at least one embodiment.

The network repository function (network repository function, NRF) (which is also referred to as a network storage device, a network repository function network element, or a network repository functional entity) is mainly configured to support a service discovery function. A network element discovery request is received from a network element function or a service communication proxy (service communication proxy, SCP), and network element discovery request information is fed back. In addition, the NRF is further configured to maintain information about available network functions and services supported by the available network functions. The NRF is alternatively understood as the network storage device. A discovery procedure is a process in which a demanding network element function (network function, NF) uses the NRF to address a specific NF or a specific service. The NRF provides an IP address, a fully qualified domain name (fully qualified domain name, FQDN), or a uniform resource identifier (unified resource identifier, URI) of a corresponding NF instance or NF service instance. In addition, the NRF further provides a network identifier (such as a PLMN ID) to implement an inter-PLMN discovery procedure. To implement addressing and discovery of the network element function, each network element is to be registered in the NRF. Some network element functions is registered in the NRF in response to the network elements running for a first time. The network repository function device is the core network device.

The network exposure function (network exposure function, NEF) (which is also referred to as a network exposure device, a network exposure functional entity, a network exposure function network element, a network capability exposure functional entity, a network capability exposure function device, a network capability exposure function network element, a network capability exposure device, or the like) is mainly configured to support capability and event exposure, and for example, is configured to securely expose, to the outside, a service and a capability provided by a 3GPP network function.

A user data repository (user data repository, UDR) (which is also referred to as a user data repository entity, a user data repository network element, a user data repository device, or the like) provides different data access authentication mechanisms for different types of data, such as subscription data and policy data, to ensure data access security.

The authentication, authorization, and accounting server (authentication, authorization, and accounting server, AAA server) (which is also referred to as an authentication and authorization server, an authentication and authorization device, an authentication device, an authentication, authorization, and accounting device, or the like) is a server program that processes a user access request, and provides verification, authorization, and accounting services. The AAA server usually cooperatively works with network access control, a gateway server, a repository, and a user information directory. A network connection server interface that cooperatively works with the AAA server is a "remote authentication dial-in user service (RADIUS)".

The network slice-specific and SNPN authentication and authorization function (network slice-specific and SNPN authentication and authorization function) is mainly configured to: support network slice-specific and authentication and authorization with the AAA server or an AAA proxy, and support access to the SNPN by using a credential from the credentials holder (credentials holder, CH), where the credentials holder performs authentication by using the AAA server.

As shown in FIG. 1, the terminal device accesses the network by using the RAN device.

The terminal device communicates with the AMF through an N1 interface (N1 for short).

The RAN communicates with the AMF through an N2 interface (N2 for short).

The RAN communicates with the UPF through an N3 interface (N3 for short).

The UPF communicates with the UPF through an N9 interface (N9 for short).

The UPF communicates with the DN through an N6 interface (N6 for short).

In addition, control plane functions such as the AMF, the SMF, the NEF, the NRF, the PCF, or the UDM shown in FIG. 1 also interact with each other through service-based interfaces.

For example, a service-based interface exhibited by the AMF is Namf.

A service-based interface exhibited by the NSSF is Nnssf.

A service-based interface exhibited by the UDM is Nudm.

A service-based interface exhibited by the NEF is Nnef.

A service-based interface exhibited by the NRF is Nnrf.

A service-based interface exhibited by the PCF is Npcf.

A service-based interface exhibited by an AF is Naf.

A service-based interface exhibited by the AUSF is Nausf.

A service-based interface exhibited by the NSSAAF is Nnssaaf.

A service-based interface exhibited by the SMF is Nsmf.

The RAN, the SMF, the PCF, or the AF in at least one embodiment is also referred to as a communication apparatus or a communication device, and is a general-purpose device or a dedicated device. This is not specifically limited in at least one embodiment.

The foregoing naming is merely used to distinguish between different functions, and does not represent that these devices are separately independent physical devices. Specific forms of the foregoing devices are not limited in at least one embodiment. For example, the devices are integrated into a same physical device, or are separately different physical devices. In actual deployment, the network elements or the devices are co-located. For example, the access and mobility management network element is co-located with a session management network element. The session management network element is co-located with the user plane network element. In response to two network elements being co-located, interaction between the two network elements provided in at least one embodiment becomes an internal operation of the co-located network element or is omitted.

The foregoing function is a network element in a hardware device, is a software function running on dedicated hardware, a combination of hardware and software, or a virtualized function instantiated on a platform (for example, a cloud platform).

Names of the devices (such as the PCF and the AMF) in FIG. 1 are merely names, and the names do not constitute a limitation on functions of the devices. In a 5G network and another network that is in the future, the foregoing devices alternatively have other names. This is not specifically limited in at least one embodiment. For example, in a 6G network, some or all of the foregoing network elements still use terms in 5G, or have other names. A general description is provided herein. Details are not described again below.

The technical solutions in at least one embodiment are applicable to the 5G network, and are also applicable to a 4G network, the 6G network, a future communication network, and the like.

To better describe the technical solutions in at least one embodiment, the following describes technical terms related to the technical solutions in at least one embodiment.

First, the NPN.

NPNs are classified into two types based on whether a core network (core network, CN) is independent.

(1) SNPN: This network is independent of the PLMN network, and is operated by an operator of the SNPN.

(2) PNI-NPN: This network depends on the PLMN network, and is operated by a conventional operator. In other words, the PNI-NPN is equivalent to the PLMN, but the PLMN provides a special slice and/or data network to provide an NPN service, and not all UEs obtains the NPN service. A UE obtains the NPN service only after slice authentication and/or reauthentication that are/is performed on the UE succeed/succeeds.

Second, external authentication.

The external authentication means that before the UE accesses the first network, the credentials holder (credentials holder, CH) different from the first network performs the security procedure on the UE. The security procedure includes procedures such as primary authentication, authentication, and authorization. In this case, the UE accesses the first network by using an external credential (or referred to as external subscription).

The CH includes an architecture. The architecture uses the AAA server to perform authentication on the UE. In this case, a core network device of the first network is to interact with the AAA server of the CH to complete an authentication procedure of the UE. In at least one embodiment, the authentication and authorization device of the first network interacts with the AAA server of the CH.

Figure 2:
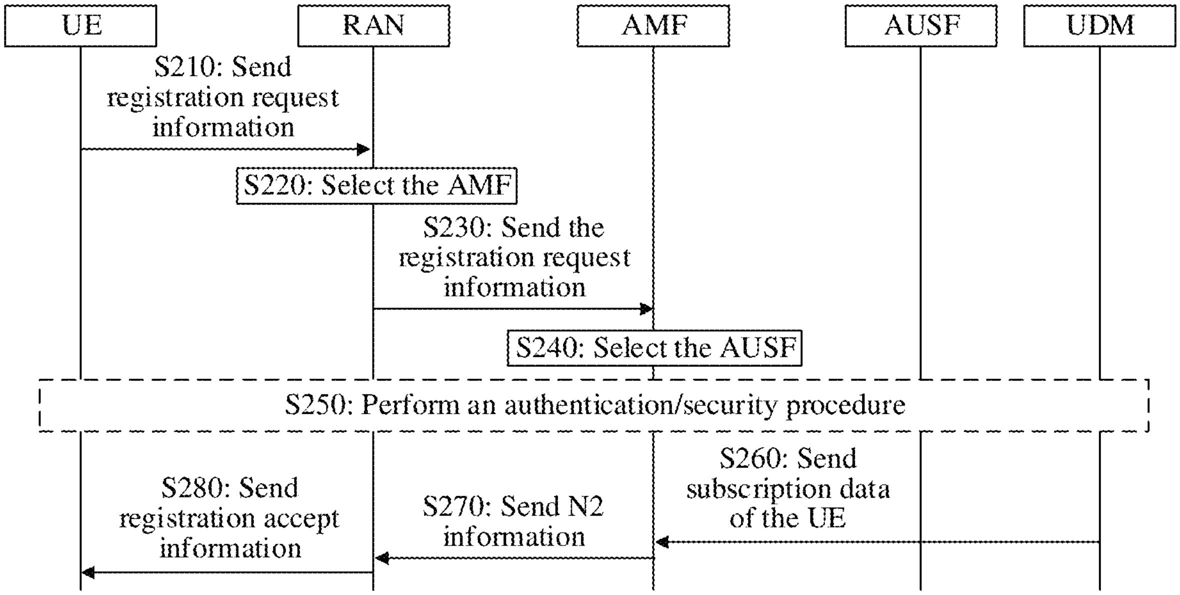
FIG. 2 is a schematic flowchart of a communication method.

FIG. 2 is a schematic flowchart of a communication method. Specific content is shown in FIG. 2.

S210: A RAN receives registration request information from a UE.

In response to the UE registering with a network, the UE sends the registration request information, where the registration request information includes identification information of the terminal device. For example, the identification information of the UE includes one or more of the following information: a globally unique temporary identity (globally unique temporary identity, GUTI), a SUCI, and a permanent equipment identity (permanent equipment identifier, PEI).

S220: The RAN performs AMF selection.

After receiving the registration request information from the UE, the RAN selects an appropriate AMF, and sends the registration request information of the UE to the AMF.

S230: The AMF receives the registration request information.

S240: The AMF performs AUSF selection.

Specifically, the AMF selects an appropriate AUSF to perform a security procedure such as authentication.

S250: Perform the authentication or security procedure.

An execution process of the authentication or security procedure relates to interaction between the UE, the AMF, the AUSF, and a UDM.

S260: Obtain subscription data of the UE.

After mutual authentication of the UE and a core network element succeeds, the AMF interacts with the UDM to obtain the subscription data of the terminal device.

S270: The AMF sends N2 information to the RAN.

The N2 information sent by the AMF to the RAN includes non-access stratum (non-access stratum, NAS) information, and the NAS information includes registration accept information.

S280: The RAN sends the registration accept information to the UE.

After receiving the registration accept information sent by the AMF, the RAN forwards the registration accept information to the UE. Therefore, the UE completes a registration procedure.

In response to the terminal device accessing a first network by using a credential (which is also referred to as an external credential) of a second network, the first network is a network that supports the external credential, for example, a standalone non-public network (standalone non-public network, SNPN). In other words, in a process in which the terminal device accesses the first network, the second network different from the first network, for example, a credentials holder (credentials holder, CH), performs primary authentication or a security procedure of the terminal device.

Because devices used by different second networks to perform the primary authentication or the security procedure of the terminal device are different, devices that are in the first network and that interact with the second networks are also different. To ensure that the second network performs an authentication procedure on the terminal device, a corresponding device of the first network is to be selected based on an architecture of the second network. Otherwise, the first network mistakenly considers that this is a communication scenario of an error case (error case) or an abnormal case (abnormal case), and consequently authentication cannot be performed by the second network on the terminal device.

More specifically, in a scenario in which a second authentication device is not deployed in the second network, in this solution, the authentication cannot be performed by the second network on the terminal device.

In view of the foregoing technical problem, embodiments described herein provide a communication method. According to the method, in at least one embodiment, the terminal device is enabled to perform the authentication.

The following describes the communication method provided in at least one embodiment with reference to FIG. 3 to FIG. 7.

For ease of describing the technical solutions in at least one embodiment, in at least one embodiment, an example in which the first network is the SNPN and the second network is the CH or a default credential server is used to describe the technical solutions in at least one embodiment. However, the description manner cannot constitute any limitation on an actual application scope of the technical solutions in at least one embodiment.

In at least one embodiment, a mobility management device corresponds to the AMF, or corresponds to another similar device configured to perform an AMF function. A first authentication device and the second authentication device corresponds to the AUSF, or corresponds to another similar device configured to perform an AUSF function. This is not specifically limited in at least one embodiment.

Figure 3:
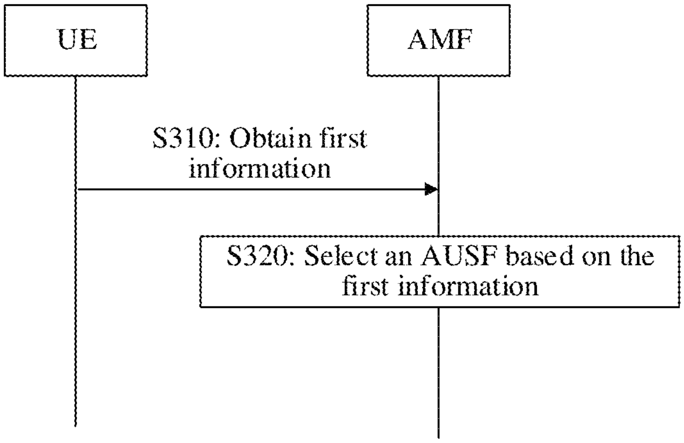
FIG. 3 is a schematic flowchart of a communication method according to at least one embodiment.

FIG. 3 is a schematic flowchart of a communication method according to at least one embodiment. Specific content of the method #300 is shown in FIG. 3.

S310: A mobility management device obtains first information of a terminal device, where the first information includes a home network identifier and/or a routing indicator that are/is of the terminal device, the first information indicates the mobility management device to select a second authentication device of a second network, a credential of the terminal device belongs to the second network, and the second authentication device is not deployed in the second network.

The home network identifier identifies a home network identifier of the terminal device or a subscriber, or identifies a network or a domain (domain) to which the terminal device belongs, for example, is a home network identifier (home network identifier, HNI). The HNI is used to select an authentication device or a unified data management device, or indicates that the credential of the terminal device belongs to the second network. For example, the credential of the terminal device belongs to a CH.

The routing indicator is used to select the authentication device or the unified data management device, and for example, is a routing indicator (routing indicator, RI).

In at least one embodiment, the routing indicator routes network signaling to the authentication device or the unified data management device with reference to the home network identifier.

The credential of the terminal device identifies the terminal device or performs verification, authorization, or authentication on the terminal device, and is, for example, a credential (credentials) or a digital certificate.

The second authentication device is configured to perform a security procedure of the terminal device. The security procedure is understood to include but is not limited to a procedure of primary authentication, primary authentication, authentication, authentication, or authorization. In other words, the second authentication device is mainly configured to perform user authentication and authentication, that is, authentication between the UE and an operator network. After receiving an authentication request initiated by the subscriber, the second authentication device performs authentication and/or authorization on the subscriber based on authentication information and/or authorization information that are/is stored in unified data management, or generates authentication and/or authorization information that are/is of the subscriber by using unified data management. For example, the second authentication device is an AUSF in the second network.

In at least one embodiment, the first information is the HNI of the terminal device, the first information is the RI of the terminal device, or the first information is the HNI and the RI of the terminal device. This is specifically determined based on a case. This is not specifically limited in at least one embodiment. Optionally, the first information further includes other information.

In at least one embodiment, the first information is a subscription concealed identifier (subscription concealed identifier, SUCI) or a subscription permanent identifier (subscription permanent identifier, SUPI) sent by the terminal device to an access network device, and the SUCI or the SUPI includes the HNI and/or the RI that are/is of the terminal device.

There is a plurality of specific forms of the first information, and the first information is not limited to "a home network identifier and/or a routing indicator that are/is of the terminal device, and the first information indicates the mobility management device to select a second authentication device of a second network". For example, In at least one embodiment, the first information indicates that the terminal device belongs to the second network, indicate that the credential of the terminal device belongs to the second network, or indicate the second network. In response to discovering and selecting the authentication device, the mobility management device learns, based on the first information, that the second authentication device of the second network is to be discovered and selected.

In at least one embodiment, the home network identifier is a home network identifier or domain name information included in the SUCI or the subscription permanent identifier (subscription permanent identifier, SUPI) of the terminal device. For example, in response to a type of the SUPI of the terminal device being an international mobile subscriber identity (international mobile subscriber identity, IMSI), the home network identifier includes a mobile country code (mobile country code, MCC) and a mobile network code (mobile network code, MNC). In response to the type of the SUPI being a network specific identifier (network specific identifier, NSI), a format of the SUPI is a network access identifier (network access identifier, NAI) format, for example, the format of the SUPI is username@realm, where the realm part is the domain name information. In this case, the home network identifier indicates the domain name information, for example, is a character string. The domain name information corresponds to the realm part in the SUPI in the NAI format. In other words, In at least one embodiment, the home network identifier is the realm part in the SUPI in the NAI format. In at least one embodiment, the realm part includes one or more of the MCC, the MNC, or a network identifier (network identifier, NID). the domain name information is domain name information of the second network to which the terminal device belongs, or the domain name information is understood to indicate the second network to which the terminal device belongs.

The mobility management device obtains the first information of the terminal device in the following way: The terminal device sends registration request information to the access network device, where the registration request information includes the first information. Then the access network device forwards the registration request information from the terminal device to the mobility management device, where the registration request information includes the first information. The registration request information indicates the terminal device to request to access a first network.

The first information indicates the mobility management device to select the second authentication device of the second network.

In at least one embodiment, a home network identifier of the first information indicates the second network. Therefore, the home network identifier indicates the mobility management device of the first network to select the second authentication device of the second network.

The credential of the terminal device belongs to the second network. the credential of the terminal device is granted or allocated by the second network, or the credential of the terminal device comes from the second network, or the second network performs the authentication on the terminal device.

In at least one embodiment, the first information includes the home network identifier and/or the routing indicator that are/is of the terminal device, and the home network identifier and/or the routing indicator indicate/indicates the second network. Therefore, the mobility management device of the first network learns that the credential of the terminal device belongs to the second network.

The second authentication device is not deployed in the second network is understood as that the second network corresponds to an architecture of the CH described above, and in the architecture, an AAA server is deployed, but the second authentication device is not deployed (or an AUSF is not deployed): or is understood as that the second network uses an AAA server instead of an AUSF to perform the authentication on the terminal device.

S320: The mobility management device selects a first authentication device based on the first information, where the first authentication device and the mobility management device belong to the first network.

Specifically, after obtaining the first information, the mobility management device determines the second network based on the HNI and/or the RI that are/is of the terminal device and that are/is included in the first information. However, because the second authentication device is not deployed in the second network, the mobility management device selects the first authentication device, where the first authentication device and the mobility management device belong to the first network.

The second network is the foregoing CH, or is another network. The first network is the foregoing SNPN, or is another network.

According to the foregoing technical solution, in response to the second authentication device not being deployed in the second network, the mobility management device of the first network selects the first authentication device of the first network, and the first authentication device is configured to perform or participate in an authentication procedure of the terminal device. For example, the first authentication device derives a key, and forward or send extensible authentication protocol (extensible authentication protocol, EAP) information, to complete an access or registration procedure in which the terminal device accesses or registers with the first network.

The first authentication device participates in the authentication procedure of the terminal device is alternatively understood as that the first authentication device participates in a part rather than all of the authentication procedure of the terminal device.

In at least one embodiment, the mobility management device does not discover the second authentication device based on the first information.

In at least one embodiment, the mobility management device obtains configuration information or configuration policy information, where the configuration information or the configuration policy information indicates to select the first authentication device in response to the mobility management device not discovering the second authentication device based on the first information. In response to the second authentication device being deployed in the second network or in response to the second network using the second authentication device to perform the authentication procedure, the mobility management device should select the second authentication device of the second network based on the first information, to perform the authentication procedure of the terminal device. The mobility management device selects the first authentication device based on the first information in response to the second authentication device not being discovered.

In at least one embodiment, the configuration information or a configuration policy is pre-configured in the mobility management device, or the mobility management device obtains the configuration information or a configuration policy from a control plane device. The control plane device includes a policy control device, a unified data management device, a user data repository device, an application function device, a network exposure device, or a network storage device.

In at least one embodiment, in response to the second authentication device not being discovered based on the first information, the mobility management device learns that the second network uses the AAA server to perform the authentication procedure, or learns that the second network does not use the second authentication device to perform the authentication. Therefore, the mobility management device selects the first authentication device of the first network to perform the authentication procedure of the terminal device (or triggers the authentication procedure of the terminal device).

Specifically, after obtaining the first information of the terminal device, the mobility management device determines, based on the HNI and/or the RI that are/is of the terminal device and that are/is included in the first information, the second network to which the credential of the terminal device belongs, and searches for the second authentication device of the second network. However, because the second authentication device is not deployed in the second network, the second network does not use the second authentication device to perform the authentication procedure, or the second network uses the AAA server to perform the authentication procedure, the mobility management device does not discover the second authentication device of the second network based on the first information.

In at least one embodiment, the mobility management device selects a first authentication device based on the first information includes the following steps.

S320#a1: The mobility management device further obtains indication information from the terminal device, where the indication information indicates that the first network supports an external credential and/or that the terminal device uses the external credential.

Specifically, the mobility management device further learns, based on the indication information from the terminal device, that the first network is a network that supports the external credential and/or that the terminal device uses the external credential. In response to the second authentication device not being discovered based on the first information, the mobility management device learns that the second authentication device is not deployed in the second network, the second network uses the AAA server to perform authentication, or the second network does not use the second authentication device to perform the authentication. In this case, the mobility management device selects the first authentication device to perform the authentication procedure of the terminal device (or triggers the authentication procedure of the terminal device), to avoid rejecting access or registration of the terminal device by mistakenly considers a registration behavior of the terminal device as an error case or an abnormal case.

S320#b1: The mobility management device selects the first authentication device based on the indication information.

Specifically, the terminal device further sends the indication information to the mobility management device, where the indication information indicates that the terminal device uses an external credential or the first network supports the external credential.

The terminal device uses the external credential is understood as that the credential of the terminal device is from the second network, that is, the credential of the terminal device is not from the first network, or is understood as that a security procedure of the terminal device is performed by a device outside the first network. The security procedure is understood to include but is not limited to a procedure of primary authentication, primary authentication, authentication, authentication, or authorization. The device outside the first network is understood as a device or a server that is in a network different from the first network. Therefore, in response to the second authentication device not being discovered based on the first information, the mobility management device determines, based on the indication information, that the terminal device uses the external credential and/or that the first network supports the external credential, and selects the first authentication device. The first authentication device participates in the authentication procedure of the terminal device.

In at least one embodiment, the mobility management device selects a first authentication device based on the first information includes the following steps.

S320#a2: The mobility management device sends request information to the network storage device, where the request information is used to request to discover the second authentication device, and the request information includes the first information.

S320#b2: The mobility management device obtains response information from the network storage device, where the response information indicates that the second authentication device is not discovered, and/or the response information includes identification information and/or address information that are/is of the first authentication device.

S320#c2: The mobility management device selects the first authentication device based on the response information.

Optionally, the request information further includes first indication information, and the first indication information indicates that the first network supports an external credential and/or that the terminal device uses the external credential.

Specifically, after obtaining the first information of the terminal device, the mobility management device sends the request information to the network storage device, where the request information is used to request to discover the second authentication device of the second network. The request information is Nnrf_NFDiscovery_Request, and the request information includes the first information and a network function type. The network function type indicates a network function type that the mobility management device uses the network storage device to discover. For example, in response to the network function type indicating an authentication device or an authentication function, the mobility management device is used to request the network storage device to discover an authentication device of the second network (or is used to request to discover an AUSF).

After obtaining the request information from the mobility management device, the network storage device sends the response information to the mobility management device. The response information includes information feeding back that the second authentication device is not discovered, or includes the identification information and/or the address information that are/is of the first authentication device, or the response information includes information that the second authentication device is not discovered and the identification information and/or the address information that are/is of the first authentication device.

In at least one embodiment, the network storage device learns, based on the HNI and/or the RI that are/is of the terminal device and that are/is included in the first information, that the second authentication device that is to be discovered belongs to the second network, and sends the response information to the mobility management device in response to the second authentication device not being discovered.

Optionally, the network storage device learns, based on the request information, that the mobility management device is to discover the second authentication device, and learns, based on the HNI and/or the RI that are/is of the terminal device and that are/is included in the first information, that the second authentication device that is to be discovered belongs to the second network. Therefore, the network storage device further infers or learn that the credential of the terminal device belongs to the second network, and send the response information to the mobility management device in response to the second authentication device not being discovered.

Optionally, the network storage device learns, based on the request information, that the mobility management device is to discover the second authentication device, and learns, based on the HNI and/or the RI that are/is of the terminal device and that are/is included in the first information, that the second authentication device that is to be discovered belongs to the second network. Therefore, the network storage device further infers or learns that the credential of the terminal device belongs to the second network. In response to the request information further including the first indication information sent by the mobility management device, and in response to the second authentication device not being discovered, the network storage device further infers or learn that the second authentication device is not deployed in the second network, the second network uses the AAA server to perform the authentication of the terminal device, or the second network does not use the second authentication device to perform the authentication of the terminal device. An NRF selects the first authentication device of the first network, and sends the response information to the mobility management device.

After obtaining the response information from the network storage device, the mobility management device selects the first authentication device based on the response information.

In at least one embodiment, the mobility management device selects a first authentication device based on the first information includes the following steps.

S320#a3: The mobility management device further obtains a network identifier from the access network device, where the network identifier indicates that the first network is a non-public network.

S320#b3: The mobility management device selects the first authentication device based on an identifier of the first network and the first information.

Specifically, the mobility management device obtains the network identifier from the access network device. For example, the network identifier is a network identification (network identification, NID), and the NID indicates that the first network is the SNPN. In response to the mobility management device not being able to find the second authentication device of the second network based on the HNI and/or the RI that are/is of the terminal device, the mobility management device selects the first authentication device of the first network.

Specifically, because the NID indicates that the first network to which the mobility management device belongs is the SNPN, and the HNI and/or the RI that are/is of the terminal device indicate/indicates that the second network to which the credential of the terminal device belongs is a network other than the SNPN, the mobility management device infers or determine that the terminal device uses the external credential or determine that the first network supports the external credential. Therefore, in response to the mobility management device discovering that the second authentication device is not deployed in the second network indicated by the HNI and/or the RI, the mobility management device determines that the second authentication device is not deployed in the second network, the second network does not use the second authentication device to perform the primary authentication or the security procedure of the terminal device, or the second network uses the AAA server to perform the primary authentication or the security procedure of the terminal device. Therefore, the mobility management device selects the first authentication device of the first network.

In at least one embodiment, the mobility management device selects a first authentication device based on the first information includes the following steps.

S320#a4: The mobility management device selects the first authentication device based on the configuration information.

The mobility management device selects the first authentication device based on the configuration information. The configuration information includes one or more HNIs and/or one or more RIs. For example, the one or more HNIs and/or the one or more RIs included in the configuration information indicate one or more networks, other than the first network, in which the AAA server is used to perform the authentication. Therefore, in response to the HNI and/or the RI that are/is of the terminal device and that are/is obtained by the mobility management device belonging to or matching the one or more HNIs and/or the one or more RIs in the configuration information, the mobility management device selects the first authentication device of the first network based on the configuration information.

More specifically, in response to the HNI and/or the RI that are/is of the terminal device belonging to or matching the one or more HNIs and/or the one or more RIs, the mobility management device selects the first authentication device of the first network.

In at least one embodiment, the configuration information is pre-configured in the mobility management device, or the mobility management device obtains the configuration information from the control plane device. The control plane device includes the policy control device, the unified data management device, the user data repository device, the application function device, the network exposure device, or the network storage device.

According to the foregoing technical solution, in at least one embodiment, in response to the terminal device using the external credential, and the second network using the AAA server to perform the authentication, the mobility management device of the first network selects the first authentication device of the first network, and does not send registration reject information to the terminal device in response to the second authentication device of the second network not being able to be found, to avoid a case in which the terminal device cannot register with or access the first network, thereby enabling the terminal device to successfully register with or access the first network.

More specifically, in response to the UE using the external credential to access the first network, and the CH uses the AAA server to perform the authentication, in response to the mobility management device of the first network using the foregoing registration method to perform second authentication device selection, the second authentication device cannot be discovered by using the network storage device. An HNI and/or an RI that are/is in the SUCI of the UE indicate/indicates the second network, and the second network uses the AAA server instead of the second authentication device to perform the authentication (for example, in response to the AAA server being deployed in the second network to perform the authentication but the second authentication device not being deployed in the second network to perform the authentication). Therefore, the network storage device does not have information about the second authentication device of the second network, or the network storage device of the first network cannot discover the second authentication device of the second network by using the network storage device of the second network. Therefore, the mobility management device of the first network cannot discover and select the second authentication device based on the HNI in the SUCI of the UE. In this case, the network storage device sends feedback information such as a querying failure (failure) or not being found (404 not found) to the mobility management device of the first network. After receiving the feedback information, the mobility management device of the first network sends registration request reject information to the UE, and consequently, the UE cannot register with the first network.

Therefore, according to the foregoing technical solution, in response to the second authentication device of the second network not being discovered, the mobility management device of the first network selects the first authentication device of the first network, so that the terminal device successfully registers with or accesses the first network. This avoids rejecting the access or registration of the terminal device because a normal registration behavior of the terminal device is considered as an error case.

FIG. 3 describes an overall procedure of a communication method according to at least one embodiment. The following further describes, with reference to FIG. 4 to FIG. 7, application of a communication method according to at least one embodiment in a specific application scenario.

Figure 4:
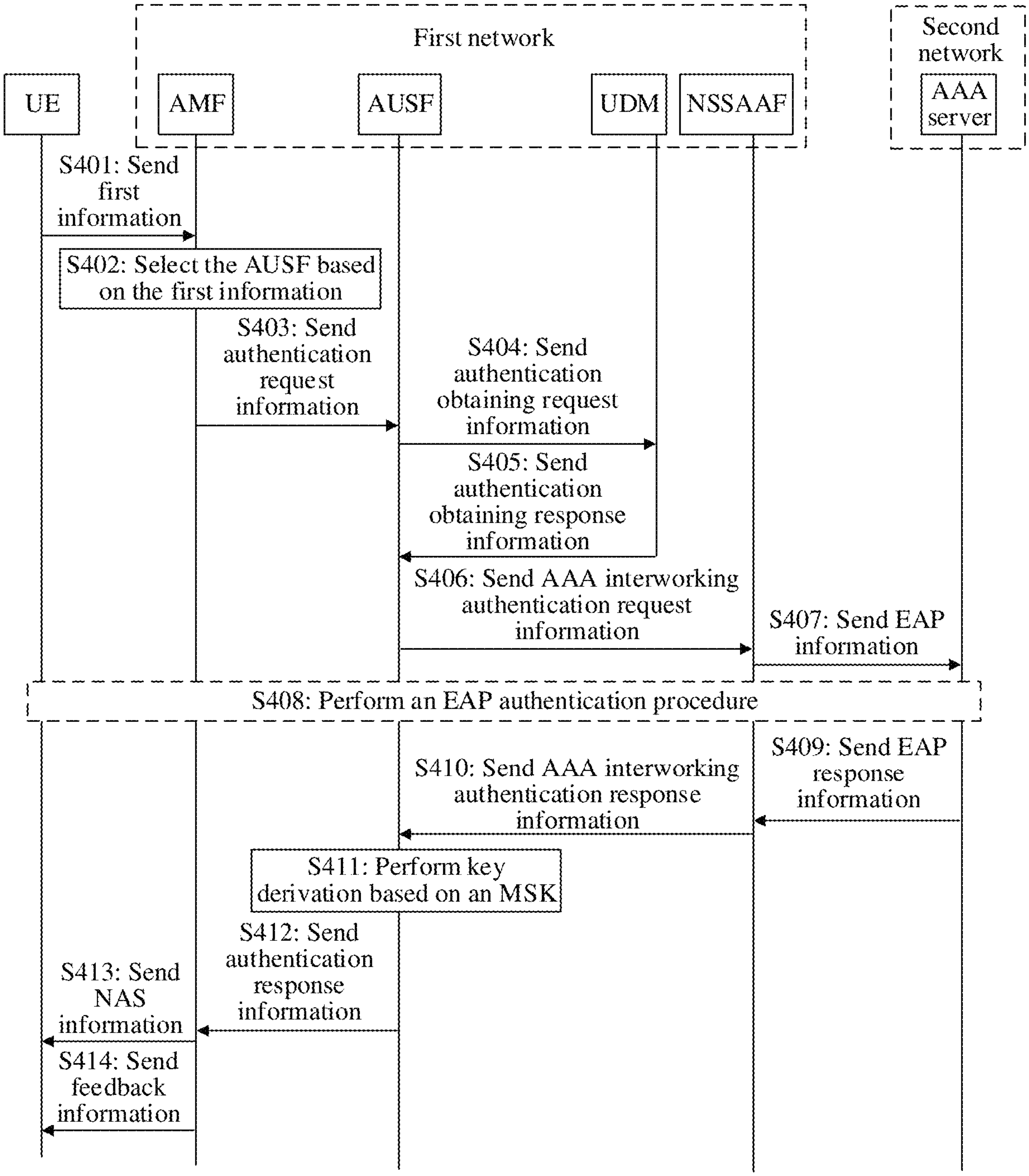
FIG. 4 is a schematic flowchart of another communication method according to at least one embodiment.

FIG. 4 is a schematic flowchart of another communication method according to at least one embodiment. Specific content of the method #400 is shown in FIG. 4.

S401 and S402 are the same as S310 and S320, and details are not described herein again.

S403: The mobility management device sends authentication request information to the first authentication device.

After sending the authentication request information to the first authentication device, the mobility management device initiates an authentication/security procedure.

S404: The first authentication device sends authentication obtaining request information to a unified data management device.

Specifically, the first authentication device sends the authentication obtaining request information (for example, Nudm_UEAU_Get Request) of the terminal device to the unified data management device, where the request information includes the SUCI of the terminal device.

The unified data management device obtains the SUPI of the terminal device based on the SUCI (for example, decrypts the SUCI to obtain the SUPI), and then the data management device queries for an authentication method applicable to the SUPI. The unified data management device determines, based on subscription data or based on the realm part (which is understood as a domain name part) in the SUPI in the network access identifier (network access identifier, NAI) format, to use an external entity to perform the primary authentication.

In at least one embodiment, in response to the unified data management device not being able to obtain the subscription data of the terminal device (for example, because the terminal device is not a terminal device that performs external authentication, and is a terminal device in a network other than the first network, and a roaming agreement is not signed between the network and the first network, the mobility management device of the first network cannot discover the second authentication device of the second network to which the terminal device belongs), the unified data management device further determines that the terminal device fails to perform the authentication. Alternatively, in response to the unified data management device learning that the terminal device does not perform external authentication, or the second network corresponding to the terminal device not performing the authentication by using the AAA server, the unified data management device further determines that the terminal device fails to perform the authentication.

S405: The unified data management device sends authentication obtaining response information to the first authentication device.

Specifically, in response to the unified data management device obtaining the SUPI based on the SUCI, the unified data management device sends the authentication obtaining response information (for example, Nudm_UEAU_Get Response) of the terminal device to the first authentication device, where the information includes the SUPI, and indicates that the first authentication device performs the external authentication, that is, performs the primary authentication by using the external entity (or an external CH). in response to the unified data management device not being able to obtain the SUPI based on the SUCI, or the unified data management device learning that the authentication of the UE cannot succeed, the unified data management device indicates, to the first authentication device, that the UE fails to perform the authentication.

S406: The first authentication device sends AAA interworking authentication request information to an authentication and authorization device.

Specifically, in response to the unified data management device sending the SUPI of the terminal device or the realm part (that is, the domain name information) in the SUPI of the terminal device and indication information to the first authentication device, the first authentication device selects the authentication and authorization device (for example, an NSSAAF) based on the indication information of the unified data management device, and sends the AAA interworking authentication request information (for example, Nnssaaf_AAA interworking_Authentication Request) to the authentication and authorization device, where the information includes the SUPI of the terminal device or the realm part (that is, the domain name information) in the SUPI.

S407: The authentication and authorization device sends EAP request information to the AAA server.

Specifically, in response to the authentication and authorization device receiving the SUPI of the terminal device in step S406, the authentication and authorization device selects the AAA server based on the domain name information corresponding to the realm part in the SUPI of the terminal device, and sends the EAP request information (for example, EAP request) to the AAA server. in response to the authentication and authorization device receiving the realm part (that is, the domain name information) in the SUPI of the terminal device in step S406, the authentication and authorization device selects the AAA server based on the domain name information corresponding to the realm part.

S408: The AAA server performs an EAP authentication procedure.

The procedure relates to the terminal device, the mobility management device, the first authentication device, the authentication and authorization device, and the AAA server.

Optionally, the EAP authentication procedure is understood as that EAP authentication is performed between the terminal device and the AAA server, the AAA server is used as an EAP server, and the terminal device is used as an EAP client. The mobility management device, the first authentication device, and the authentication and authorization device are configured to forward EAP information between the terminal device and the AAA server.

S409: The AAA server sends EAP response information to the authentication and authorization device.

After the authentication of the terminal device succeeds, the AAA server sends the EAP response information (for example, EAP-response) to the authentication and authorization device, where the response information includes EAP success information (EAP success) and a master session key (master session key, MSK).

S410: The authentication and authorization device sends AAA interworking authentication response information to the first authentication device.

The AAA interworking authentication response information (for example, Nnssaaf_AAA interworking_Authentication Response) includes EAP success and the MSK.

S411: The first authentication device performs key derivation.

Specifically, the first authentication device performs the key derivation based on the MSK.

S412: The first authentication device sends authentication response information to the mobility management device.

The response information is Nausf_UEAU_Authenticate Response, and the response information includes the EAP success information, a derived key, and the SUPI.

In step S405, in response to the first authentication device receiving authentication failure information from the unified data management device, the first authentication device skips steps S406 to S411, and directly sends the authentication failure information to the mobility management device.

S413: The mobility management device sends the EAP success information to the terminal device.

The EAP success information is sent based on non-access stratum (non-access stratum, NAS) information.

The NAS information includes the EAP success information.

In step S412, in response to the mobility management device receiving the authentication failure information sent by the first authentication device, the mobility management device does not send the EAP success information, or does send the authentication failure information or registration reject information to the terminal device.

S414: The mobility management device sends feedback information to the terminal device.

Specifically, in response to the authentication of the UE succeeding, the mobility management device sends registration accept information to the UE. Alternatively, in response to the UE failing to perform the authentication, the mobility management device sends the registration reject information to the UE.

In step S413 and step S414, the sending is performed by using a same message, or is performed by using different messages.

According to the foregoing technical solution, in response to the second authentication device of the second network not being discovered, the mobility management device of the first network selects the first authentication device of the first network, so that the terminal device successfully registers with or accesses the first network. This avoids rejecting access or registration of the terminal device because a normal registration behavior of the terminal device is considered as an error case.

Figure 5:
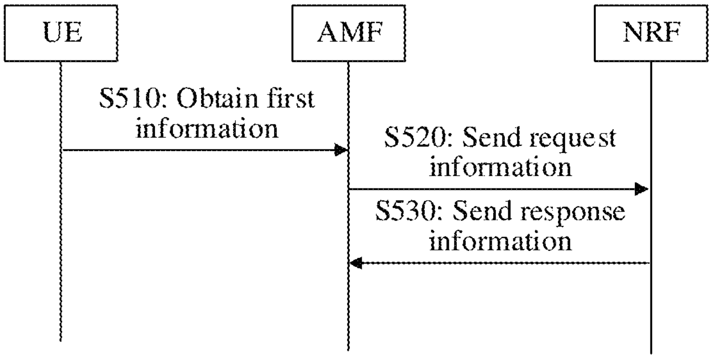
FIG. 5 is a schematic flowchart of still another communication method according to at least one embodiment.

FIG. 5 is a schematic flowchart of still another communication method according to at least one embodiment. Specific content of the method #500 is shown in FIG. 5.

S510 is the same as step S310, and details are not described herein again.

S520: The mobility management device sends request information to a network storage device, where the request information includes the HNI and/or the RI that are/is of the terminal device, the request information is used to request to discover the second authentication device of the second network, the credential of the terminal device belongs to the second network, and the second authentication device is not deployed in the second network.

Correspondingly, the network storage device receives the request information from the mobility management device.

In at least one embodiment, the request information further includes first indication information, and the first indication information indicates that a first network supports an external credential and/or that the terminal device uses the external credential.

Specifically, after obtaining the first information of the terminal device, the mobility management device sends the request information to the network storage device, where the request information is used to request to discover the second authentication device of the second network. The request information is Nnrf_NFDiscovery_Request, and the request information includes the HNI and/or the RI that are/is of the terminal device and a network function type. The network function type indicates a network function type that the mobility management device uses the network storage device to discover. For example, in response to the network function type indicating an authentication device, the request information indicates to request to discover the second authentication device of the second network.

S530: The network storage device sends response information to the mobility management device, where the response information includes an indication that the second authentication device is not discovered, and/or the response information includes identification information and/or address information that are/is of a first authentication device.

The first authentication device, the network storage device, and the mobility management device belong to the first network.

After obtaining the request information from the mobility management device, the network storage device sends the response information to the mobility management device. The response information includes information that the second authentication device is not discovered, or includes the identification information and/or the address information that are/is of the first authentication device, or the response information includes information that the second authentication device is not discovered and the identification information and/or the address information that are/is of the first authentication device.

In at least one embodiment, before the network storage device sends the response information to the mobility management device, the network storage device does not discover the second authentication device.

Specifically, the network storage device determines, based on the HNI and/or the RI, that the second authentication device that is to be discovered belongs to the second network, and sends the response information to the mobility management device in response to the second authentication device of the second network not being discovered. Then, after obtaining the response information from the network storage device, the mobility management device selects the first authentication device based on the response information.

In at least one embodiment, that the network storage device sends response information to the mobility management device includes:

In response to the HNI and/or the RI that are/is of the terminal device matching configuration information, sending the response information, where the configuration information includes one or more HNIs and/or one or more RIs.

For example, the one or more HNIs and/or the one or more RIs included in the configuration information indicate one or more networks, other than the first network, in which the AAA server is used to perform the authentication or the second authentication device is not used to perform the authentication. Therefore, in response to the HNI and/or the RI that are/is of the terminal device and that are/is obtained by the mobility management device belonging to or matching the one or more HNIs and/or the one or more RIs in the configuration information, the network storage device sends the response information based on the configuration information.

More specifically, in response to the home network identifier and/or the routing indicator that are/is of the terminal device belonging to or matching the one or more home network identifiers and/or the one or more routing indicators, the network storage device sends the response information to the mobility management device based on the configuration information.

In at least one embodiment, the configuration information is pre-configured in the network storage device, or the network storage device obtains the configuration information from a control plane device. The control plane device includes the mobility management device, a policy control device, a unified data management device, a user data repository device, a network exposure device, or an application function device.

In at least one embodiment, that the network storage device sends response information to the mobility management device includes:

The network storage device sends the response information based on the first indication information.

Specifically, the network storage device determines, based on the first indication information, that the first network to which the mobility management device belongs is an SNPN, that the terminal device uses the external credential, or that the second authentication device that the mobility management device is used to request to discover is configured to perform external authentication. In response to the network storage device not discovering or not being able to discover the second authentication device that is of the second network and that corresponds to the HNI and/or RI that are/is of the terminal device, the network storage device sends the response information to the mobility management device.

In at least one embodiment, that the network storage device sends response information to the mobility management device includes:

The network storage device sends the response information in response to the second authentication device not being discovered.

Specifically, in response to the network storage device not discovering or not being able to discover the second authentication device that is of the second network and that corresponds to the HNI and/or the RI that are/is of the terminal device, the network storage device sends the response information to the mobility management device.

According to the foregoing technical solution, in response to the second authentication device of the second network not being discovered, the mobility management device of the first network selects the first authentication device of the first network, so that the terminal device successfully registers with or accesses the first network. This avoids rejecting access or registration of the terminal device because a normal registration behavior of the terminal device is considered as an error case.

FIG. 5 describes an overall procedure of another communication method according to at least one embodiment. The following describes, with reference to FIG. 6, application of the communication method provided in FIG. 5 according to at least one embodiment in a specific application scenario.

Figure 6:
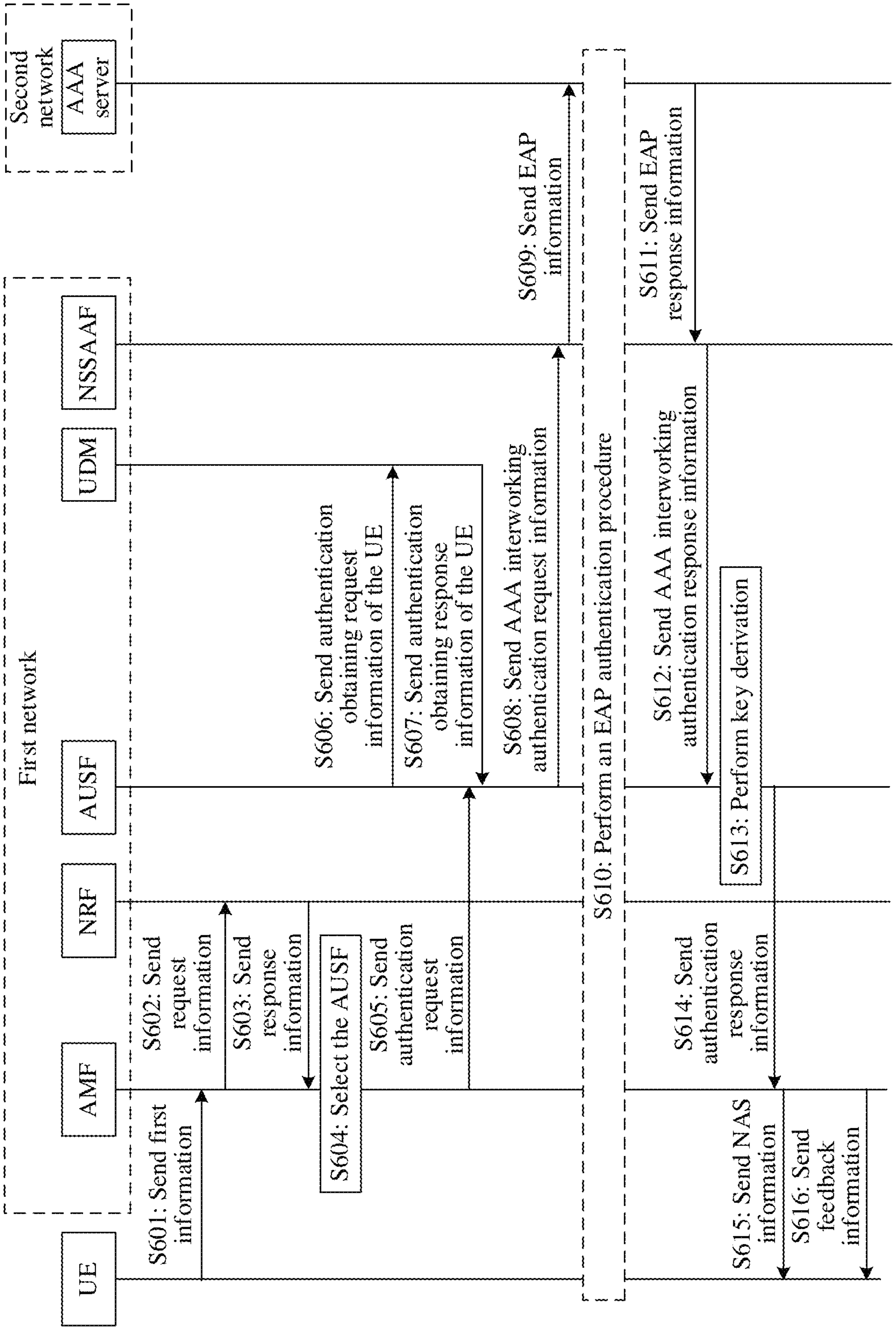
FIG. 6 is a schematic flowchart of yet another communication method according to at least one embodiment.

FIG. 6 is a schematic flowchart of yet another communication method according to at least one embodiment. Specific content of the method #600 is shown in FIG. 6.

S601 to S603 are the same as steps S510 to S530, and details are not described herein again.

S604: The mobility management device selects the first authentication device.

Specifically, after obtaining the first information of the terminal device, the mobility management device sends the request information to the network storage device, where the request information is used to request to discover the second authentication device of the second network. The request information is Nnrf_NFDiscovery_Request, and the information includes the first information and the network function type. The network function type indicates the network function type that the mobility management device uses the network storage device to discover. For example, in response to the network function type indicating the authentication device, the mobility management device is used to request the network storage device to discover the authentication device of the second network (or is used to request to discover an AUSF).

After obtaining the request information from the mobility management device, the network storage device sends the response information to the mobility management device. The response information includes the information that the second authentication device is not discovered, or includes the identification information and/or the address information that are/is of the first authentication device, or the response information includes the information that the second authentication device is not discovered and the identification information and/or the address information that are/is of the first authentication device.

In at least one embodiment, the network storage device learns, based on the HNI and/or the RI that are/is of the terminal device and that are/is included in the first information, that the second authentication device that is to be discovered belongs to the second network, and sends the response information to the mobility management device in response to the second authentication device not being discovered.

Optionally, the network storage device learns, based on the request information, that the mobility management device uses to discover the second authentication device, and learns, based on the HNI and/or the RI that are/is of the terminal device and that are/is included in the first information, that the second authentication device that is to be discovered belongs to the second network. Therefore, the network storage device further infers or learn that the credential of the terminal device belongs to the second network, and send the response information to the mobility management device in response to the second authentication device not being discovered.

Optionally, the network storage device learns, based on the request information, that the mobility management device uses to discover the second authentication device, and learns, based on the HNI and/or the RI that are/is of the terminal device and that are/is included in the first information, that the second authentication device that is to be discovered belongs to the second network. Therefore, the network storage device further infers or learns that the credential of the terminal device belongs to the second network. In response to the request information further including the first indication information sent by the mobility management device, and in response to the second authentication device not being discovered, the network storage device further infers or learn that the second authentication device is not deployed in the second network, the second network does not use the second authentication device to perform the authentication of the terminal device, or the second network uses the AAA server to perform the authentication of the terminal device. The network storage device selects the first authentication device of the first network, and sends the response information to the mobility management device.

After obtaining the response information from the network storage device, the mobility management device selects the first authentication device based on the response information.

S605 to S616 are the same as steps S403 to S414, and details are not described herein again.

According to the foregoing technical solution, in at least one embodiment, in response to the terminal device using the external credential, and the second authentication device not being deployed in the second network, the second network does not use the second authentication device to perform the authentication of the terminal device, or the second network uses the AAA server to perform the authentication of the terminal device, the network storage device enables the mobility management device to select the first authentication device of the first network, and does not enable the mobility management device to send registration reject information to the terminal device due to sending failure or error indication information to the mobility management device in response to the second authentication device of the second network not being discovered or not able to be discovered, to avoid a case in which the terminal device cannot register with or access the first network.

Figure 7:
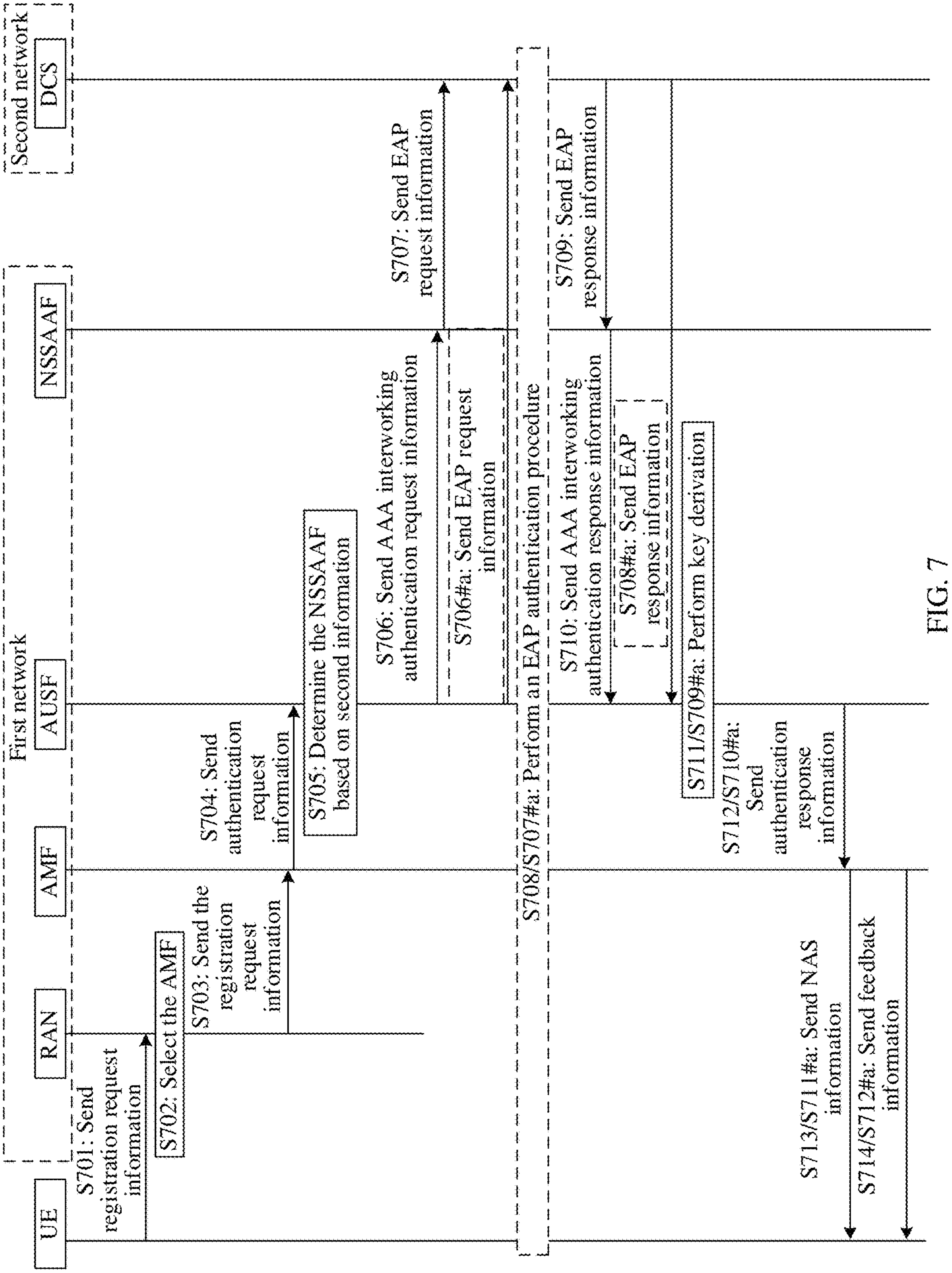
FIG. 7 is a schematic flowchart of still yet another communication method according to at least one embodiment.

FIG. 7 is a schematic flowchart of still yet another communication method according to at least one embodiment. Specific content of the method #700 is shown in FIG. 7.

S701: A terminal device sends registration request information to an access network device.

The registration request information includes an access network (access network, AN) parameter and NAS registration request information. The AN parameter includes onboarding indication (onboarding indication). A registration type indicated in the NAS registration request information is SNPN onboarding (SNPN onboarding).

S702: The access network device selects a mobility management device.

Specifically, the access network device selects, based on the onboarding indication, a mobility management device that supports an onboarding function.

S703: The access network device sends the registration request information to the mobility management device.

Specifically, after the access network device selects the mobility management device based on the onboarding indication information, the access network device forwards the NAS registration request information to the mobility management device selected by the access network device.

S704: The mobility management device sends authentication request information to a third authentication device.

The third authentication device is similar to the foregoing first authentication device, corresponds to an AUSF, or corresponds to another similar device configured to perform an AUSF function. This is not specifically limited in at least one embodiment.

Correspondingly, the third authentication device receives the authentication request information from the mobility management device.

Specifically, the mobility management device determines, based on that the registration type in the NAS registration request information is a standalone non-public network onboarding (SNPN Onboarding) type, that the terminal device registers the SNPN to perform onboarding. The mobility management device selects an appropriate third authentication device based on configuration information (or referred to as configuration data or a configuration policy) of the onboarding, and sends the authentication request information to a first authentication device, where the information includes a SUCI of the terminal device.

In at least one embodiment, the configuration information is pre-configured in the mobility management device, or the configuration information is obtained by the mobility management device from a control plane device. The control plane device includes a policy control device, a unified data management device, a user data repository device, a network storage device, an application function device, or a network exposure device.

The authentication request information further includes second information, and the second information indicates that the terminal device performs the onboarding, or the second information indicates that the terminal device performs registration for the onboarding.

In at least one embodiment, the second information is indication information, or the SUCI or a SUPI of the terminal device.

In at least one embodiment, a type of the SUCI or the SUPI of the terminal device indicates that the terminal device performs the onboarding, or indicates that the terminal device performs the registration for the onboarding.

In at least one embodiment, the second information included in the authentication request information is sent by the mobility management device to the third authentication device (or is understood as that the second information is from the mobility management device), or is from the terminal device, and indicates that the terminal device performs the onboarding, or indicates that the terminal device performs the registration for the onboarding.

In at least one embodiment, in response to the second information being sent by the mobility management device or being from the mobility management device, the second information is generated by the mobility management device.

In at least one embodiment, the request information is Nausf_UEAU_Authenticate Request.

S705: The third authentication device determines a fourth authentication device based on the second information.

Specifically, the third authentication device determines, based on the second information in the authentication request information sent by the mobility management device, that the terminal device performs the onboarding, and determines the fourth authentication device based on the second information.

The fourth authentication device is configured to perform a security procedure of the terminal device. The security procedure includes but is not limited to a procedure of primary authentication, primary authentication, authentication, authentication, or authorization. In at least one embodiment, the fourth authentication device is configured to perform EAP authentication. For example, the fourth authentication device is used as an EAP server to perform authentication on an EAP client.

In at least one embodiment, in response to the second information being sent by the mobility management device, or being from the mobility management device, the second information is the indication information, and indicates that the terminal device performs the onboarding, or indicates that the terminal device performs the registration for the onboarding.

In at least one embodiment, in response to the second information being from the terminal device, the second information is the SUCI or the SUPI of the terminal device.

Optionally, domain name information (or a realm part or a home network identifier and/or a routing indicator) in the SUPI or the SUCI of the terminal device indicates a default credential domain name, indicates that the terminal device performs the onboarding, or indicates that the terminal device performs the registration for the onboarding.

In at least one embodiment, the third authentication device determines, based on the configuration information and the second information, that the terminal device performs the onboarding or that the terminal device performs the registration for the onboarding.

In at least one embodiment, the configuration information includes one or more pieces of domain name information, and the one or more pieces of domain name information indicate one or more default credential domain names. In response to the second information belonging to or matching the configuration information, the second information indicates that the terminal device performs the onboarding, or indicate that the terminal device performs the registration for the onboarding.

The second information belongs to or matches the configuration information is understood as that the second information belongs to or matches the one or more pieces of domain name information.

In at least one embodiment, the domain name information includes one or more of the home network identifier, the routing indicator, an MCC, an MNC, and a NID.

In at least one embodiment, the configuration information is pre-configured in the third authentication device, or is obtained by the third authentication device from a control plane device. The control plane device includes the mobility management device, a policy control device, a unified data management device, a user data repository device, an application function device, and a network exposure device.

In at least one embodiment, the third authentication device further obtains the SUPI based on the SUCI of the terminal device.

The third authentication device obtains the SUPI based on the SUCI is understood as that the third authentication device restores the SUPI from the SUCI, or is understood as that the third authentication device decrypts the SUCI into the SUPI.

In response to the third authentication device skipping selecting the unified data management device, the SUCI of the terminal device cannot be decrypted or restored to the SUPI by using the unified data management device. However, in a registration procedure of the terminal device, signaling exchange between core network devices (or control plane devices) usually includes identification information of the terminal device, and the identification information is usually the SUPI. Therefore, in response to learning that the terminal device performs the onboarding, or learning that the terminal device performs the registration for the onboarding, the third authentication device obtains or restore the SUPI based on the SUCI, to ensure that the signaling exchange between the core network devices (or the control plane devices) is not affected.

In at least one embodiment, the fourth authentication device includes a network slice-specific and SNPN authentication and authorization device, and a default credentials server (default credentials server, DCS).

Optionally, the DCS is an authentication, authorization, and accounting server.

In response to the fourth authentication device being the network slice-specific and non-public network authentication and authorization device, the method includes the following steps.

S706: The third authentication device sends AAA interworking authentication request information to the fourth authentication device.

The third authentication device determines the fourth authentication device based on the second information.

Specifically, after determining that the terminal device performs the onboarding, the third authentication device determines the fourth authentication device based on the second information. The fourth authentication device is configured to perform an authentication procedure of the terminal device.

In at least one embodiment, the first authentication device skips selecting the unified data management device.

Specifically, the third authentication device learns, based on the second information, that the terminal device performs the onboarding, or learns that the terminal device performs the registration for the onboarding. The third authentication device is able to not select the unified data management device, or skips selecting the unified data management device.

In response to the network slice-specific and non-public network authentication and authorization device interacting with the DCS, the third authentication device sends the authentication request information to the network slice-specific and non-public network authentication and authorization device. The information includes the identification information of the terminal device, for example, one or more of the SUCI, the SUPI, or an EAP identity of the terminal device. in response to the identification information of the terminal device including the SUPI, before sending the request information to the network slice-specific and non-public network authentication and authorization device, the first authentication device further obtains the SUPI based on the SUCI of the terminal device.

The third authentication device obtains the SUPI based on the SUCI is understood as that the third authentication device restores the SUPI from the SUCI, or is understood as that the third authentication device decrypts the SUCI into the SUPI.

In response to the identification information of the terminal device including the EAP identity, the third authentication device further sends the domain name information to the network slice-specific and SNPN authentication and authorization device. The domain name information is from the realm part (which is understood as the home network identifier or the HNI) in the SUCI or the SUPI of the terminal device, so that the network slice-specific and non-public network authentication and authorization device learn of a domain or a network in which the network slice-specific and non-public network authentication and authorization device interact with the DCS.

S707: The network slice-specific and non-public network authentication and authorization device sends EAP request information to the DCS.

In at least one embodiment, the network slice-specific and non-public network authentication and authorization device selects the DCS based on the domain name information sent by the third authentication device. The network slice-specific and non-public network authentication and authorization device sends the EAP request information (EAP request) to the DCS, where the information includes an EAP start (EAP start) and the EAP identity (EAP identity).

S708: The DCS performs an EAP authentication procedure.

The procedure relates to interaction among the terminal device, the mobility management device, the third authentication device, the network slice-specific and non-public network authentication and authorization device, and the DCS.

Optionally, the network slice-specific and non-public network authentication and authorization device forwards EAP information.

S709: The DCS sends EAP response information (EAP response) to the network slice-specific and non-public network authentication and authorization device.

After authentication of the terminal device succeeds, the DCS sends the EAP response information (for example, EAP-response) to the network slice-specific and non-public network authentication and authorization device, where the response information includes EAP success information (EAP success).

Optionally, the response information further includes a master session key (master session key, MSK).

S710: The network slice-specific and non-public network authentication and authorization device sends AAA interworking authentication response information to the third authentication device.

The AAA interworking authentication response information includes the EAP success information.

Optionally, the AAA interworking authentication response information further includes the MSK.

Optionally, in S711, the third authentication device performs key derivation.

Specifically, in response to the third authentication device receiving the MSK, the third authentication device performs the key derivation based on the MSK.

S712: The third authentication device sends authentication response information to the mobility management device.

The response information includes an EAP success and the identification information of the UE (the identification information is the SUCI or the SUPI).

Optionally, the response information further includes a derived key.

In at least one embodiment, the response information is Nausf_UEAU_Authenticate Response.

S713: The mobility management device sends the EAP success information to the terminal device.

In at least one embodiment, the EAP success information is sent based on NAS information.

The NAS information includes the EAP success information.

S714: The mobility management device sends feedback information to the terminal device.

Specifically, in response to the authentication of the UE succeeding, the mobility management device sends registration accept information to the UE. Alternatively, in response to the UE failing to perform the authentication, the mobility management device sends registration reject information to the UE.

The foregoing technical solution is intended for a scenario in which the fourth authentication device is the network slice-specific and non-public network authentication and authorization device. In response to the fourth authentication device being the DCS, the method includes the following steps.

S706#a: The third authentication device sends EAP request information to the DCS.

Specifically, in response to the fourth authentication device being the DCS, the third authentication device sends the EAP request information (for example, EAP request) to the DCS, where the request information includes an EAP start and an EAP identity.

S707#a: The DCS performs an EAP authentication procedure.

The procedure relates to interaction among the terminal device, the mobility management device, the third authentication device, and the DCS.

S708#a: The DCS sends EAP response information to the third authentication device.

Specifically, the DCS sends the EAP response message (EAP response) to an authentication and authorization device, where the information includes an EAP success.

Optionally, the information further includes an MSK.

Optionally, in S709#a, the third authentication device performs key derivation.

Specifically, in response to the third authentication device receiving the MSK, the third authentication device performs the key derivation based on the MSK.

S710#a: The third authentication device sends authentication response information to the mobility management device.

The response information includes the EAP success and the identification information of the UE (the identification information is the SUCI or the SUPI).

Optionally, the response information further includes a derived key.

In at least one embodiment, the response information is Nausf_UEAU_Authenticate Response.

S711#a: The mobility management device sends EAP success information to the terminal device.

In at least one embodiment, the EAP success information is sent based on NAS information.

The NAS information includes the EAP success information.

S712#a: The mobility management device sends feedback information to the terminal device.

Specifically, in response to the authentication of the UE succeeding, the mobility management device sends registration accept information to the UE. Alternatively, in response to the UE failing to perform the authentication, the mobility management device sends registration reject information to the UE.

In at least one embodiment, in response to learning that the terminal device performs the onboarding, or learning that the terminal device performs the registration for the onboarding, the third authentication device selects the fourth authentication device, and the fourth authentication device performs an authentication procedure of the terminal device, so that the terminal device successfully accesses a network. In addition, a case in which the terminal device cannot access the network because of an authentication failure or an introduced error case or abnormal case, which results from that the unified data management device does not have subscription data related to the terminal device after the third authentication device selects the unified data management device, and interacts with the unified data management device, is avoided.

The information in at least one embodiment is also understood as a message. For example, the EAP request information is understood as an EAP request message, the response information is understood as a response message, and the NAS information is understood as a NAS message.

Figure 8:
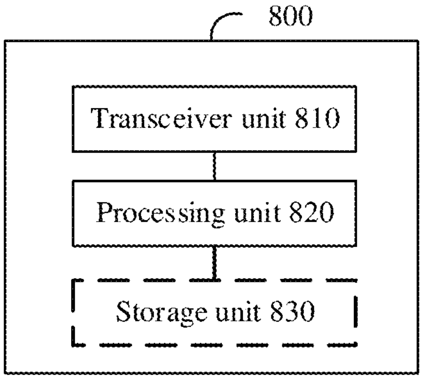
FIG. 8 is a schematic block diagram of a communication device according to at least one embodiment.

FIG. 8 is a schematic block diagram of a communication device 800 according to at least one embodiment. As shown in the figure, the communication device 800 includes a transceiver unit 810 and a processing unit 820.

In at least one embodiment, the communication device 800 is the mobility management device in the foregoing method embodiments, or is a chip configured to implement a function of the mobility management device in the foregoing method embodiments.

The communication device 800 corresponds to the mobility management device in at least one embodiment, and the communication device 800 includes a unit configured to perform the methods performed by the mobility management device in FIG. 3 to FIG. 7. In addition, the units in the communication device 800 and the foregoing other operations and/or functions are separately used to implement corresponding procedures in FIG. 3 to FIG. 7.

For example, the communication device 800 implements the actions, steps, or methods related to the mobility management device in S310, S320, S330, and S340 in the foregoing method embodiments, and also implements the actions, steps, or methods related to the mobility management device in S510, S520, and S530 in the foregoing method embodiments.

The foregoing content is merely used an example for understanding. The communication device 800 further implements other steps, actions, or methods related to the mobility management device in the foregoing method embodiments. Details are not described herein.

AA specific process in which the units perform the foregoing corresponding steps is described in detail in the foregoing method embodiments. For brevity, details are not described herein.

In at least one embodiment, the communication device 800 is the network storage device in the foregoing method embodiments, or is a chip configured to implement a function of the network storage device in the foregoing method embodiments.

The communication device 800 corresponds to the network storage device in at least one embodiment, and the communication device 800 includes a unit configured to perform the methods performed by the network storage device in FIG. 3 to FIG. 8. In addition, the units in the communication device 800 and the foregoing other operations and/or functions are separately used to implement corresponding procedures in FIG. 3 to FIG. 7. a specific process in which the units perform the foregoing corresponding steps is described in detail in the foregoing method embodiments. For brevity, details are not described herein.

The foregoing content is merely used an example for understanding. The communication device 800 further implements other steps, actions, or methods related to the network storage device in the foregoing method embodiments. Details are not described herein.

A specific process in which the units perform the foregoing corresponding steps is described in detail in the foregoing method embodiments. For brevity, details are not described herein.

The foregoing content is merely used an example for understanding. The communication device 800 further implements other steps, actions, or methods related to the first authentication device in the foregoing method embodiments. Details are not described herein.

A specific process in which the units perform the foregoing corresponding steps is described in detail in the foregoing method embodiments. For brevity, details are not described herein.

The foregoing content is merely used an example for understanding. The communication device 800 further implements other steps, actions, or methods related to the second authentication device in the foregoing method embodiments. Details are not described herein.

A specific process in which the units perform the foregoing corresponding steps is described in detail in the foregoing method embodiments. For brevity, details are not described herein.

The foregoing content is merely used an example for understanding. The communication device 800 further implements other steps, actions, or methods related to the third authentication device in the foregoing method embodiments. Details are not described herein.

A specific process in which the units perform the foregoing corresponding steps is described in detail in the foregoing method embodiments. For brevity, details are not described herein.

The foregoing content is merely used an example for understanding. The communication device 800 further implements other steps, actions, or methods related to the fourth authentication device in the foregoing method embodiments. Details are not described herein.

A specific process in which the units perform the foregoing corresponding steps is described in detail in the foregoing method embodiments. For brevity, details are not described herein.

Figure 9:
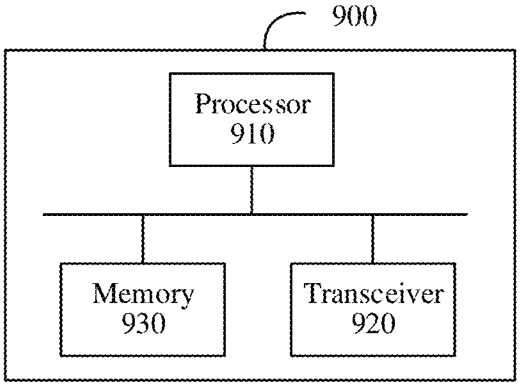
FIG. 9 is a schematic block diagram of another communication device according to at least one embodiment.

The transceiver unit 810 in the communication device 800 corresponds to a transceiver 920 in a communication device 900 shown in FIG. 9, and the processing unit 820 in the communication device 800 corresponds to a processor 910 in the communication device 900 shown in FIG. 9.

In response to the communication device 800 being the chip, the chip includes a transceiver unit and a processing unit. The transceiver unit is an input/output circuit or a communication interface. The processing unit is a processor, a microprocessor, or an integrated circuit that is integrated on the chip.

The transceiver unit 810 is configured to implement signal receiving and sending operations of the communication device 800. The processing unit 820 is configured to implement a signal processing operation of the communication device 800.

Optionally, the communication device 800 further includes a storage unit 830, and the storage unit 830 is configured to store instructions.

FIG. 9 is a schematic block diagram of a communication device 900 according to at least one embodiment. As shown in the figure, the communication device 900 includes at least one processor 910 and a transceiver 920. The processor 910 is coupled to a memory, and is configured to execute instructions stored in the memory, to control the transceiver 920 to send a signal and/or receive a signal. Optionally, the communication device 900 further includes a memory 930, configured to store the instructions.

The processor 910 and the memory 930 are combined into one processing apparatus, and the processor 910 is configured to execute program code stored in the memory 930 to implement the foregoing functions. During specific implementation, the memory 930 is alternatively integrated in the processor 910, or is independent of the processor 910.

The transceiver 920 includes a receiver (or referred to as a receiving machine) and a transmitter (or referred to as a transmitting machine). The transceiver 920 further includes an antenna, and there is one or more antennas. The transceiver 920 is a communication interface or an interface circuit.

In response to the communication device 900 being a chip, the chip includes a transceiver unit and a processing unit. The transceiver unit is an input/output circuit or a communication interface. The processing unit is a processor, a microprocessor, or an integrated circuit that is integrated on the chip. At least one embodiment further provides a processing apparatus, including a processor and an interface. The processor is configured to perform the methods in the foregoing method embodiments.

The processing apparatus is a chip. For example, the processing apparatus is a field programmable gate array (field programmable gate array, FPGA), an application-specific integrated chip (application-specific integrated circuit, ASIC), a system on chip (system on chip, SoC), a central processing unit (central processing unit, CPU), a network processor (network processor, NP), a digital signal processing circuit (digital signal processor, DSP), a micro-controller (micro controller unit, MCU), a programmable controller (programmable logic device, PLD), or another integrated chip.

In an implementation process, steps in the foregoing methods are implemented by using a hardware integrated logic circuit in the processor, or by using instructions in a form of software. The steps of the methods disclosed with reference to at least one embodiment are directly performed by a hardware processor, or is performed by using a combination of hardware in the processor and a software module. The software module is located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

At least one embodiment further provides a computer-readable storage medium. The computer-readable storage medium stores computer instructions used to implement the method performed by the mobility management device in the foregoing method embodiments.

For example, in response to a computer program being executed by a computer, the computer is enabled to implement the method performed by the mobility management device in the foregoing method embodiments.

At least one embodiment further provides a computer-readable storage medium. The computer-readable storage medium stores computer instructions used to implement the method performed by the network storage device in the foregoing method embodiments.

For example, in response to a computer program being executed by a computer, the computer is enabled to implement the method performed by the network storage device in the foregoing method embodiments.

At least one embodiment further provides a computer-readable storage medium. The computer-readable storage medium stores computer instructions used to implement the method performed by the first authentication device in the foregoing method embodiments.

For example, in response to a computer program being executed by a computer, the computer is enabled to implement the method performed by the first authentication device in the foregoing method embodiments.

At least one embodiment further provides a computer-readable storage medium. The computer-readable storage medium stores computer instructions used to implement the method performed by the second authentication device in the foregoing method embodiments.

For example, in response to a computer program being executed by a computer, the computer is enabled to implement the method performed by the second authentication device in the foregoing method embodiments.

At least one embodiment further provides a computer-readable storage medium. The computer-readable storage medium stores computer instructions used to implement the method performed by the third authentication device in the foregoing method embodiments.

For example, in response to a computer program being executed by a computer, the computer is enabled to implement the method performed by the third authentication device in the foregoing method embodiments.

At least one embodiment further provides a computer-readable storage medium. The computer-readable storage medium stores computer instructions used to implement the method performed by the fourth authentication device in the foregoing method embodiments.

For example, in response to a computer program being executed by a computer, the computer is enabled to implement the method performed by the fourth authentication device in the foregoing method embodiments.

At least one embodiment further provides a computer program product including instructions. In response to the instructions being executed by a computer, the computer is enabled to implement the method performed by the mobility management device, the method performed by the network storage device, the method performed by the first authentication device, the method performed by the second authentication device, the method performed by the third authentication device, or the method performed by the fourth authentication device in the foregoing method embodiments.

At least one embodiment provides a communication system, including a mobility management device configured to perform the foregoing method performed by the mobility management device, and a network storage device configured to perform the foregoing method performed by the network storage device.

At least one embodiment provides a communication system, including a mobility management device configured to perform the foregoing method performed by the mobility management device, a network storage device configured to perform the foregoing method performed by the network storage device, and a third authentication device configured to perform the foregoing method performed by the third authentication device.

A person skilled in the art understands that, for the purpose of convenient and brief description, for explanations of related content and beneficial effects in any one of the foregoing provided communication apparatuses, refer to corresponding method embodiments provided above. Details are not described herein again.

A specific structure of an execution body of the method provided in at least one embodiment is not particularly limited in at least one embodiment, provided that communication is performed according to the method provided in at least one embodiment by running a program that records code of the method provided in at least one embodiment. For example, the execution body of the method provided in at least one embodiment is a terminal device or a network device, or is a function module that is in the terminal device or the network device and that invokes and executes a program.

Aspects or features of at least one embodiment are implemented as a method, an apparatus or a product that uses standard programming and/or engineering technologies. As used herein, the term "manufactured article" encompasses a computer program accessible from any computer-readable device, carrier, or medium.

The computer-readable storage medium is any usable medium accessible by a computer, or a data storage device, for example, a server or a data center, integrating one or more usable media. The usable medium (or the computer-readable medium) includes, for example, but is not limited to, various media that store program code such as a magnetic medium or a magnetic storage device (for example, a floppy disk, a hard disk (for example, a removable hard disk), or a magnetic tape), an optical medium (for example, an optical disc, a compact disc (compact disc, CD), or a digital versatile disc (digital versatile disc, DVD)), a smart card, and a flash memory device (for example, an erasable programmable read-only memory (erasable programmable read-only memory, EPROM), a card, a stick, or a key drive), a semiconductor medium (for example, a solid-state drive (solid-state drive, SSD), a USB flash drive, a read-only memory (read-only memory, ROM), or a random access memory (random access memory, RAM)).

The various storage media described herein represent one or more devices and/or other machine-readable media for storing information. The term "machine-readable medium" includes, but is not limited to: radio channels and various other media that store, include, and/or carry instructions and/or data.

The memory mentioned in at least one embodiment is a volatile memory or a nonvolatile memory, or includes both a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM). For example, the RAM is used as an external cache. By way of example, and not limitation, the RAM includes the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In response to a processor being a general-purpose processor, a DSP, an ASIC, an FPGA or another programmable logic device, a discrete gate or a transistor logic device, or a discrete hardware component, the memory (storage module) is integrated into the processor.

The memory described herein is intended to include, but is not limited to, these and any other appropriate type of memory.

In at least one embodiment, the disclosed apparatus and method are implemented in other manners. For example, the foregoing described apparatus embodiments are only examples. For example, division into the foregoing units is only logic function division, and is another division manner in actual implementation. For example, a plurality of units or components is combined or integrated into another system, or some features are ignored or not performed. In addition, the displayed or discussed mutual couplings, direct couplings, or communication connections are implemented through some interfaces. Indirect couplings or communication connections between apparatuses or units are implemented in an electrical form, a mechanical form, or another form.

The foregoing units described as separate parts may or may not be physically separate, and parts displayed as units may or may not be physical units, are located in one position, or are distributed on a plurality of network units. Some or all of the units are selected based on an actual usage to implement the solutions provided in at least one embodiment.

In addition, function units in at least one embodiment are integrated into one unit, each of the units exist alone physically, or two or more units are integrated into one unit.

All or some of the foregoing embodiments are implemented by using software, hardware, firmware, or any combination thereof.

In response to the software being used to implement embodiments, all or some of embodiments are implemented in a form of a computer program product. The computer program product includes one or more computer instructions. In response to computer program instructions being loaded and executed on the computer, the procedure or functions according to at least one embodiment are all or partially generated. The computer is a general-purpose computer, a dedicated computer, a computer network, or another programmable apparatus. For example, the computer is a personal computer, a server, or a network device. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line) or wireless (for example, infrared, radio, or microwave) manner. For the computer-readable storage medium, refer to the foregoing descriptions.

In at least one embodiment, numbers "first", "second", . . . are merely used to distinguish between different objects, for example, to distinguish between different network devices, and constitute no limitation on the scope of at least one embodiment. Embodiments described herein are not limited thereto.

In at least one embodiment, "when" and "if" both refer to corresponding processing performed by a network element in an objective case, are not intended to limit time, do not use a determining action to be performed during implementation of the network element, and do not imply that there is any other limitation.

In at least one embodiment, "B corresponding to A" indicates that B is associated with A, and B is determined based on A. However, determining B based on A does not mean that B is determined based only on A. B is alternatively able to be determined based on A and/or other information.

The term "and/or" in at least one embodiment describes only an association relationship for describing associated objects and represents that three relationships exist. For example, A and/or B represent the following three cases: Only A exists, both A and B exist, and only B exists. In addition, the character "/" in embodiments described herein generally indicates an "or" relationship between the associated objects.

The foregoing descriptions are merely specific implementations of at least one embodiment, but are not intended to limit the protection scope of at least one embodiment. Any variation or replacement readily figured out by a person skilled in the art within the technical scope disclosed at least one embodiment shall fall within the protection scope of embodiments described herein. Therefore, the protection scope of at least one embodiment shall be subject to the protection scope of the claims.

What is claimed is:

1. A communication method, comprising:

obtaining, by an authentication server function, information that is usable to indicate a terminal device to perform onboarding;

selecting, by the authentication server function, a network slice-specific and non-public network authentication and authorization function based on the information that is usable to indicate the terminal device to perform the onboarding, wherein the network slice-specific and non-public network authentication and authorization function is configured to perform an authentication procedure of the terminal device; and sending, by the authentication server function, authentication request information to the network slice-specific and non-public network authentication and authorization function.

2. The method according to claim 1, wherein the obtaining the information that is usable to indicate the terminal device to perform the onboarding includes obtaining the information that is usable to indicate the terminal device to perform the onboarding sent by a mobility management device; or obtaining the information that is usable to indicate the terminal device to perform the onboarding sent by the terminal device.

3. The method according to claim 2, wherein in response to the obtaining the information that is usable to indicate the terminal device to perform the onboarding sent by the terminal device includes obtaining the information that is usable to indicate the terminal device to perform the onboarding is a subscription concealed identifier of the terminal device.

4. The method according to claim 3, wherein the obtaining the information that is usable to indicate the terminal device to perform the onboarding including a subscription concealed identifier of the terminal device includes obtaining a domain name information in the subscription concealed identifier that is usable to indicate a default credential domain name.

5. The method according to claim 1, wherein the method further comprises:

determining, by the authentication server function based on configuration information and the information that is usable to indicate the terminal device to perform the onboarding, that the terminal device performs the onboarding.

6. The method according to claim 5, wherein the determining, by the authentication server function based on the configuration information and the information that is usable to indicate the terminal device to perform the onboarding is based on the configuration information including one or more pieces of domain name information, and the one or more pieces of domain name information indicate one or more default credential domain names.

7. The method according to claim 3, wherein the method further comprises:

obtaining, by the authentication server function, a subscription permanent identifier of the terminal device based on the subscription concealed identifier of the terminal device, wherein the authentication request information includes the subscription permanent identifier.

8. The method according to claim 1, wherein the method further comprises:

skipping selecting, by the authentication server function, a unified data management device.

9. A communication method, comprising:

receiving, by a network storage device, request information from a mobility management device, wherein the request information includes at least one of a home network identifier or a routing indicator that is of a terminal device, the request information is usable to request to discover a second authentication server function of a second network, a credential of the terminal device belongs to the second network, and the second network uses an authentication, authorization, and accounting server to perform primary authentication of the terminal device; and sending, by the network storage device, response information to the mobility management device, wherein the response information includes an indication that the second authentication server function is not discovered, or the response information includes identification information or address information that is of a first authentication server function, wherein the first authentication server function, the network storage device, and the mobility management device belong to a first network.

10. The method according to claim 9, wherein the receiving, by the network storage device, the request information further includes receiving first indication information, and the first indication information is usable to indicate that the first network supports an external credential and/or that the terminal device uses the external credential.

11. The method according to claim 9, wherein before the sending, by the network storage device, the response information to the mobility management device, the method further comprises:

discovering, by the network storage device, no second authentication server function.

12. The method according to claim 9, wherein the sending, by the network storage device, the response information to the mobility management device includes:

in response to the home network identifier and/or the routing indicator that are/is of the terminal device matching configuration information, sending the response information, wherein the configuration information includes one or more home network identifiers and/or one or more routing indicators; or sending, by the network storage device, the response information based on first indication information; or sending, by the network storage device, the response information in response to the second authentication server function not being discovered.

13. The method according to claim 9, wherein the first network is an Simple Network Management Protocol and the second network is a credentials holder.

14. A communication device, comprising:

at least one memory storing instructions; and at least one processor connected to the at least one memory, wherein the at least one processor is configured to execute the instructions to perform operations to:

obtain, by an authentication server function, information that is usable to indicate a terminal device to perform onboarding;

select, by the authentication server function, a network slice-specific and non-public network authentication and authorization function based on the information that is usable to indicate the terminal device to perform the onboarding, wherein the network slice-specific and non-public network authentication and authorization function is configured to perform an authentication procedure of the terminal device; and send authentication request information to the network slice-specific and non-public network authentication and authorization function.

15. The communication device according to claim 14, wherein the information that is usable to indicate the terminal device to perform the onboarding is sent by a mobility management device; or the information that is usable to indicate the terminal device to perform the onboarding is sent by the terminal device.

16. The communication device according to claim 15, wherein in response to the information that is usable to indicate the terminal device to perform the onboarding being sent by the terminal device, the information that is usable to indicate the terminal device to perform the onboarding is a subscription concealed identifier of the terminal device.

17. The communication device according to claim 16, wherein domain name information in the subscription concealed identifier is usable to indicate a default credential domain name.

18. The communication device according to claim 14, wherein the at least one processor is further configured to:

determine, based on configuration information and the information that is usable to indicate the terminal device to perform the onboarding, that the terminal device performs the onboarding.

19. The communication device according to claim 18, wherein the configuration information includes one or more pieces of domain name information, and the one or more pieces of domain name information is usable to indicate one or more default credential domain names.

20. The communication device according to claim 16, wherein the at least one processor is further configured to:

obtain a subscription permanent identifier of the terminal device based on the subscription concealed identifier of the terminal device, wherein the authentication request information comprises the subscription permanent identifier.

21. The communication device according to claim 14, wherein the at least one processor is further configured to:

skip selecting a unified data management device.

22. A communication device, comprising:

at least one memory storing instructions; and at least one processor connected to the at least one memory, wherein the at least one processor is configured to execute the instructions to perform operations to:

receive request information from a mobility management device, wherein the request information includes at least one of a home network identifier or a routing indicator that is of a terminal device, the request information is usable to request to discover a second authentication server function of a second network, a credential of the terminal device belongs to the second network, and the second network uses an authentication, authorization, and accounting server to perform primary authentication of the terminal device; and send response information to the mobility management device, wherein the response information includes an indication that the second authentication server function is not discovered, or the response information includes at least one of identification information or address information that is of a first authentication server function, wherein the first authentication server function, a network storage device, and the mobility management device belong to a first network.

23. The communication device according to claim 22, wherein the request information further includes first indication information, and the first indication information is usable to indicated that the first network supports an external credential and/or that the terminal device uses the external credential.

24. The communication device according claim 22, wherein the at least one processor is further configured to:

send the response information to the mobility management device, in response to the home network identifier and/or the routing indicator that are/is of the terminal device matching configuration information, wherein the configuration information includes one or more home network identifiers and/or one or more routing indicators; or send the response information to the mobility management device based on first indication information; or send the response information to the mobility management device in response to the second authentication server function not being discovered.

25. A non-transitory computer-readable storage medium, wherein the non-transitory computer-readable storage medium stores a computer program or instructions, and the computer program or the instructions are usable to implement the method according to claim 1.

* * * * *